(12) United States Patent
Melville, Jr. et al.

(10) Patent No.: US 9,932,218 B2
(45) Date of Patent: *Apr. 3, 2018

(54) COLD BEVERAGE DISPENSER AND CUTTER ASSEMBLY FOR COLD BEVERAGE DISPENSER

(71) Applicant: BIBO BARMAID LLC, Clinton, NJ (US)

(72) Inventors: Douglas F. Melville, Jr., Simsbury, CT (US); Gary M. Barch, Simsbury, CT (US); Craig Bures, Prospect, CT (US); Debra L. Walker, Clinton, NJ (US)

(73) Assignee: BIBO BARMAID LLC, Clinton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/060,706

(22) Filed: Mar. 4, 2016

(65) Prior Publication Data
US 2017/0253473 A1    Sep. 7, 2017

(51) Int. Cl.
*B67D 3/00* (2006.01)

(52) U.S. Cl.
CPC ......... *B67D 3/0019* (2013.01); *B67D 3/0012* (2013.01); *B67D 3/0061* (2013.01); *B67D 3/0077* (2013.01)

(58) Field of Classification Search
CPC .. B67D 3/0012; B67D 3/0019; B67D 3/0061; B67D 3/0077
(Continued)

(56) References Cited

U.S. PATENT DOCUMENTS 2,103,389 A    12/1937   Salfisberg
2,635,788 A     4/1953   Snyder et al.
(Continued)

FOREIGN PATENT DOCUMENTS

EP      0299767 A1     1/1989
JP      H09290898 A   11/1997
(Continued)

OTHER PUBLICATIONS

"International Preliminary Report on Patentability for PCT Patent Application No. PCT/US2015/041632", dated Jan. 24, 2017, 5 pages.
(Continued)

*Primary Examiner* — Nicolas A Arnett
(74) *Attorney, Agent, or Firm* — Medley, Behrens & Lewis, LLC; Lorri W. Cooper, Esq.

(57) ABSTRACT

An apparatus for making a beverage includes a housing, a first receptacle, a second receptacle, a cutting assembly, a water source, and at least one water outlet. The first receptacle is positioned in the housing for accepting a first beverage container containing a liquid. The second receptacle is positioned in the housing for accepting a second beverage container containing a liquid. The cutting assembly has a cutting blade that is movable relative to the first and second receptacles for opening the first and second containers substantially simultaneously so that liquid stored therein can be at least in part evacuated. The water source is coupled to the housing The at least one water outlet is associated with one or more of the first and second receptacles for adding water to the liquid from the first and second beverage containers from the water source.

16 Claims, 18 Drawing Sheets

(58) Field of Classification Search
USPC .............. 141/9, 100, 105–107, 329–330
See application file for complete search history.

(56) References Cited

U.S. PATENT DOCUMENTS

| | | |
|---|---|---|
| 2,663,461 A | 12/1953 | Brown |
| 3,009,498 A | 11/1961 | Fohr |
| 3,186,625 A | 6/1965 | Mead et al. |
| 3,199,437 A | 8/1965 | Nelsen |
| 3,429,495 A | 2/1969 | McClosky |
| 4,171,755 A | 10/1979 | Carlisle |
| 4,463,876 A | 8/1984 | Swallert |
| 4,808,346 A | 2/1989 | Strenger, III |
| D304,299 S | 10/1989 | Sakamoto |
| D306,555 S | 3/1990 | Lane et al. |
| 4,915,261 A | 4/1990 | Strenger, III |
| D309,432 S | 7/1990 | Mancini |
| D319,976 S | 9/1991 | Wortley et al. |
| 5,067,635 A | 11/1991 | Thomsen |
| 5,125,536 A * | 6/1992 | Winder ............. B67B 7/24 141/330 |
| D351,992 S | 11/1994 | Jacques |
| D354,906 S | 1/1995 | Lane, Jr. et al. |
| 5,497,913 A | 3/1996 | Baker |
| 5,551,606 A * | 9/1996 | Rai ............. B67C 11/02 141/329 |
| 5,706,661 A * | 1/1998 | Frank ............. A23G 9/045 426/67 |
| D392,559 S | 3/1998 | Smith et al. |
| 6,079,315 A | 6/2000 | Beaulieu et al. |
| 6,155,457 A | 12/2000 | Landa et al. |
| 6,164,825 A | 12/2000 | Larkin et al. |
| D442,078 S | 5/2001 | Fuquen |
| D452,144 S | 12/2001 | Tedeschi, Jr. et al. |
| D455,645 S | 4/2002 | Bell et al. |
| D463,974 S | 10/2002 | Berman |
| 6,606,938 B2 | 8/2003 | Taylor |
| 6,607,762 B2 | 8/2003 | Lazaris et al. |
| 6,655,260 B2 | 12/2003 | Lazaris et al. |
| D484,972 S | 1/2004 | Steele, IV et al. |
| D501,399 S | 2/2005 | Tobolka |
| D509,751 S | 9/2005 | Risgalla |
| 7,013,933 B2 * | 3/2006 | Sher ............. A23F 5/243 141/100 |
| D523,758 S | 6/2006 | Risgalla |
| D533,462 S | 12/2006 | Bachmann |
| 7,165,488 B2 | 1/2007 | Bragg et al. |
| D545,689 S | 7/2007 | Peel |
| D550,568 S | 9/2007 | Lau et al. |
| D555,010 S | 11/2007 | Maier et al. |
| D558,594 S | 1/2008 | Kirou et al. |
| 7,347,138 B2 | 3/2008 | Bragg et al. |
| 7,360,418 B2 | 4/2008 | Pelovitz |
| 7,377,162 B2 | 5/2008 | Lazaris |
| 7,398,726 B2 | 7/2008 | Streeter et al. |
| D578,010 S | 10/2008 | Friedland et al. |
| D578,011 S | 10/2008 | Friedland et al. |
| D578,016 S | 10/2008 | Friedland et al. |
| D578,017 S | 10/2008 | Friedland et al. |
| D578,018 S | 10/2008 | Friedland et al. |
| D578,019 S | 10/2008 | Friedland et al. |
| D580,780 S | 11/2008 | Kelly et al. |
| D580,782 S | 11/2008 | Murray |
| D585,302 S | 1/2009 | Beyer et al. |
| D586,231 S | 2/2009 | Friedland et al. |
| 7,490,638 B2 * | 2/2009 | Sher ............. A23F 5/243 141/100 |
| D587,597 S | 3/2009 | Friedland et al. |
| 7,513,192 B2 | 4/2009 | Sullivan et al. |
| D595,592 S | 7/2009 | Beyer et al. |
| D601,037 S | 9/2009 | Beyer et al. |
| 7,640,845 B2 | 1/2010 | Woodnorth et al. |
| D610,467 S | 2/2010 | Kozarsky |
| D613,181 S | 4/2010 | Friedland et al. |
| D623,536 S | 9/2010 | Bohmke |
| D627,236 S | 11/2010 | Kozarsky |
| D640,566 S | 6/2011 | Norlin et al. |
| D643,745 S | 8/2011 | Hartley |
| 8,091,735 B2 | 1/2012 | Girard et al. |
| 8,104,642 B2 | 1/2012 | Bambrick et al. |
| 8,151,694 B2 | 4/2012 | Jacobs et al. |
| D668,554 S | 10/2012 | Tsuchiya |
| 8,361,527 B2 | 1/2013 | Winkler et al. |
| D676,335 S | 2/2013 | Murray |
| D676,336 S | 2/2013 | Murray |
| 8,495,949 B2 | 7/2013 | Tinkler et al. |
| 8,516,948 B2 | 7/2013 | Zimmerman et al. |
| D689,371 S | 9/2013 | Ross |
| D689,776 S | 9/2013 | Murray |
| D692,315 S | 10/2013 | Bohmke et al. |
| D692,316 S | 10/2013 | Bohmke et al. |
| D693,241 S | 11/2013 | Kilber et al. |
| 8,573,114 B2 | 11/2013 | Huang et al. |
| 8,590,753 B2 | 11/2013 | Marina et al. |
| D695,132 S | 12/2013 | Bouthillon |
| 8,609,170 B2 | 12/2013 | Tinkler et al. |
| D698,663 S | 2/2014 | Lin |
| D700,066 S | 2/2014 | Berman |
| 8,667,892 B2 | 3/2014 | Cominelli et al. |
| D703,549 S | 4/2014 | Murray |
| 8,708,195 B1 | 4/2014 | Duran |
| 8,740,020 B2 | 6/2014 | Marina et al. |
| 8,757,222 B2 | 6/2014 | Rudick et al. |
| 8,808,775 B2 | 8/2014 | Novak et al. |
| 8,881,948 B1 | 11/2014 | Lassota |
| D723,385 S | 3/2015 | Gaudard |
| 8,989,895 B2 * | 3/2015 | Holman ............. G07F 17/0064 700/233 |
| D736,099 S | 8/2015 | Deuerer |
| 2004/0007588 A1 | 1/2004 | Danby |
| 2006/0118581 A1 | 6/2006 | Clark |
| 2008/0010950 A1 | 1/2008 | Peck et al. |
| 2008/0314927 A1 | 12/2008 | Martin |
| 2009/0057340 A1 | 3/2009 | Moothart |
| 2009/0120961 A1 | 5/2009 | Dietschi et al. |
| 2010/0116842 A1 | 5/2010 | Hecht et al. |
| 2010/0154919 A1 | 6/2010 | Jansen |
| 2010/0269707 A1 | 10/2010 | Wiemer et al. |
| 2011/0017776 A1 * | 1/2011 | Metropulos ......... B67D 1/0888 222/129.1 |
| 2011/0166910 A1 | 7/2011 | Marina et al. |
| 2011/0226343 A1 | 9/2011 | Novak et al. |
| 2012/0183657 A1 | 6/2012 | Marina et al. |
| 2013/0015206 A1 | 1/2013 | van Haperen et al. |
| 2013/0042941 A1 | 2/2013 | van Haperen et al. |
| 2013/0054257 A1 * | 2/2013 | Holman ............. G07F 17/0064 705/2 |
| 2013/0068109 A1 * | 3/2013 | Pribus ............. A47J 31/46 99/295 |
| 2013/0071532 A1 * | 3/2013 | Pribus ............. A47J 31/46 426/431 |
| 2013/0189400 A1 * | 7/2013 | Pribus ............. B65D 85/8043 426/115 |
| 2013/0233180 A1 | 9/2013 | Belmont |
| 2013/0340626 A1 * | 12/2013 | Oh ............. B65D 85/8043 99/295 |
| 2014/0069953 A1 | 3/2014 | Metropulos et al. |
| 2014/0072678 A1 | 3/2014 | Jenkins |
| 2014/0106048 A1 | 4/2014 | Harper |
| 2014/0114469 A1 | 4/2014 | Givens et al. |
| 2014/0134299 A1 | 5/2014 | Guidorzi et al. |
| 2014/0175125 A1 | 6/2014 | Breault |
| 2014/0209634 A1 | 7/2014 | Metropulos et al. |
| 2014/0224130 A1 | 8/2014 | Castellani et al. |
| 2014/0263407 A1 | 9/2014 | Rudick et al. |
| 2014/0263414 A1 | 9/2014 | San Miguel et al. |
| 2014/0372233 A1 | 12/2014 | Knecht et al. |
| 2015/0079240 A1 * | 3/2015 | Lo Foro ............. A47J 31/401 426/115 |
| 2015/0125586 A1 | 5/2015 | Ergican |
| 2015/0135965 A1 * | 5/2015 | Lo Foro ............. A47J 31/407 99/285 |

(56) References Cited

U.S. PATENT DOCUMENTS

2015/0144001 A1* 5/2015 Lo Foro ............... A47J 31/407
                                                      99/283
2015/0307248 A1   10/2015 Patwardhan et al.
2016/0023879 A1    1/2016 Walker et al.

FOREIGN PATENT DOCUMENTS

| RU | 69850 U1      | 1/2008 |
|----|---------------|--------|
| WO | 2004075702 A1 | 9/2004 |
| WO | 2008104751 A1 | 9/2008 |

OTHER PUBLICATIONS

"Post Mix Soda Fountains", The CHI Company, New and Used Beverage Equipment for Honest Prices, Retrieved Date: Oct. 14, 2014, Retrieved At: <http://www.chicompany.net/index.php?main_page=index&cPath=25>, 3 pages.

Google Image Search Results for Single Serve Liquid Portion Pack Pouch, Retrieved Date: Sep. 15, 2015, Retrieved At: <<https://www.google.com/search?q=single+serve+liquid+portion+pac+pouch&rlz=1T4GGHP_enUS617US617&source=lnms&tbm=isch>>, pp. 1-7.

Google Image Search Results for Pouch Shapes, Retrieved Date: Sep. 15, 2015, Retrieved At: <<https://www.google.com/search?q=pouch+shapes&riz=1T4GGHP_enUS617US817&tbm=isch&tbo=u&source=univ&sa=X&ved=0CB4Q>>, pp. 1-8.

"International Search Report and Written Opinion for PCT/US2015/041632", dated Oct. 29, 2015, 7 pages.

"International Search Report and Written Opinion for PCT Patent Application No. PCT/US2017/020841", dated Jun. 29, 2017, 7 pages.

* cited by examiner

COLD BEVERAGE DISPENSER AND CUTTER ASSEMBLY FOR COLD BEVERAGE DISPENSER

FIELD

The examples described herein relate to a cold beverage dispenser for use in making mixed drinks and/or health and wellness drinks. The examples described herein also concern a cutter and a cutter cartridge for use in connection with a cold beverage dispenser.

BACKGROUND

Many consumers enjoy trying different alcoholic beverages. Often, in order to try multiple types of beverages, it is necessary to purchase a multitude of ingredients and multiple bottles of alcohol. This is often very costly and requires a significant amount of storage, since bottle are often not emptied and need to be stored. Because of this, consumers tend to stick with a certain type of drink. Countertop coffee makers have become very popular among consumers. These countertop coffee makers include a brewer which heats water from a reservoir and inputs hot water to a single serve cartridge that houses coffee grinds and a filter. Coffee is "brewed" in the cartridge and then permitted to exit the brewer into a cup. Existing machines of this nature puncture the top and bottom surfaces of the cartridge in order to permit hot water to enter the top of the cartridge and coffee to exit a bottom of the cartridge.

SUMMARY

A cold beverage dispenser is shown and described. A cutter and cutter assembly is also shown and described.

BRIEF DESCRIPTION OF THE DRAWINGS

FIG. 7 depicts a configuration before pouches are inserted into the dispenser and the cover is closed;

FIG. 8 depicts a configuration after the cover has been opened and the pouches have been inserted into the respective receptacles, but before the pouches have been cut;

FIG. 9 depicts a configuration where the pawl under the cover has been engaged prior to cutting of the pouches;

FIG. 10 depicts a cutaway front alternative view of the dispenser like that shown in FIG. 9;

FIG. 11 depicts a configuration where the cover has been closed and the blade has sliced the pouches;

FIG. 12 depicts the blade in a partially retracted position after the pouches have been cut open;

FIG. 13 depicts the blade in a fully retracted position after the pouches have been cut open;

DETAILED DESCRIPTION

Figure 1:
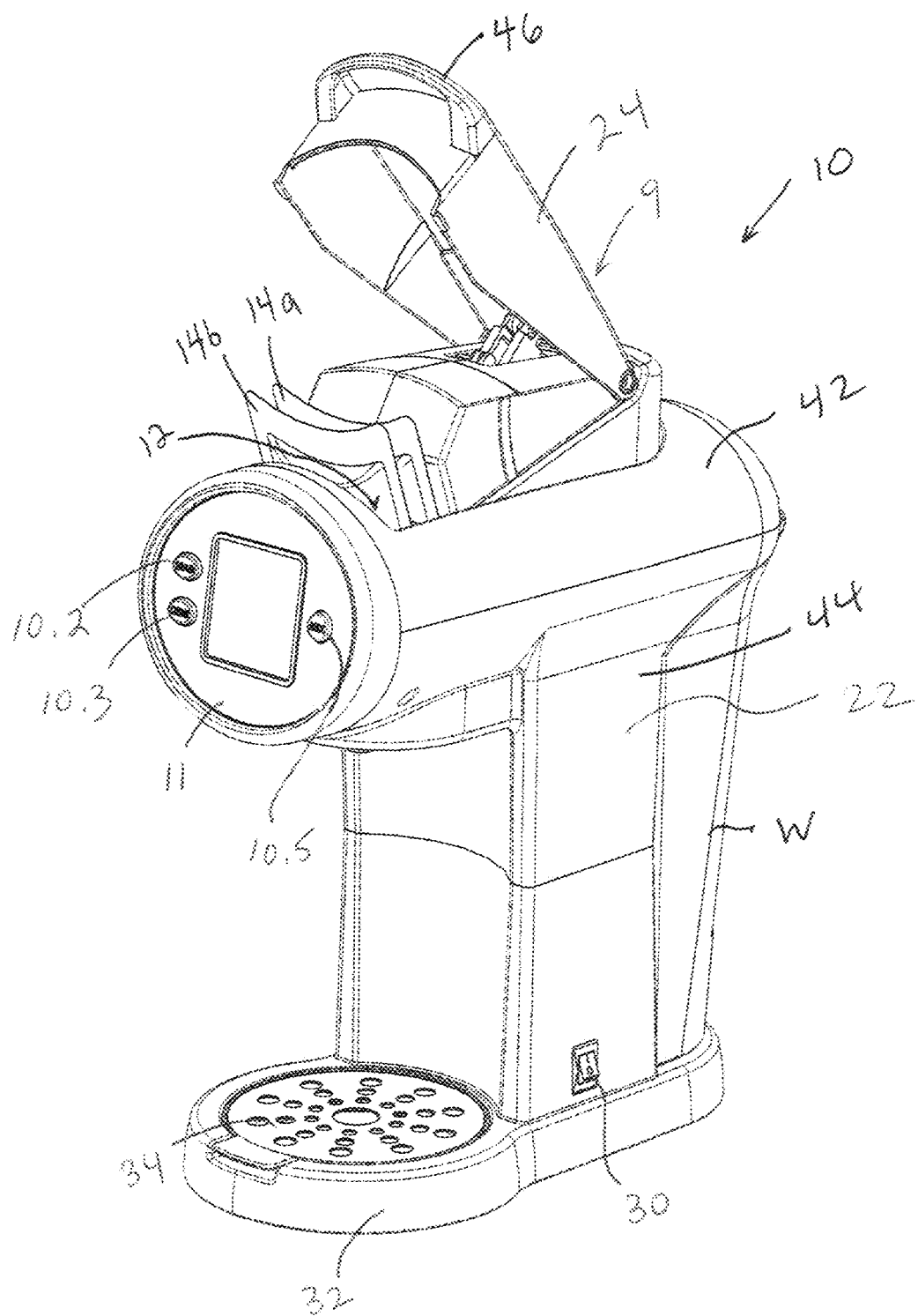
FIG. 1 depicts a perspective view of an example beverage dispenser 10 according to the invention, showing a cover of the beverage dispenser in an open position.
Figure 2:
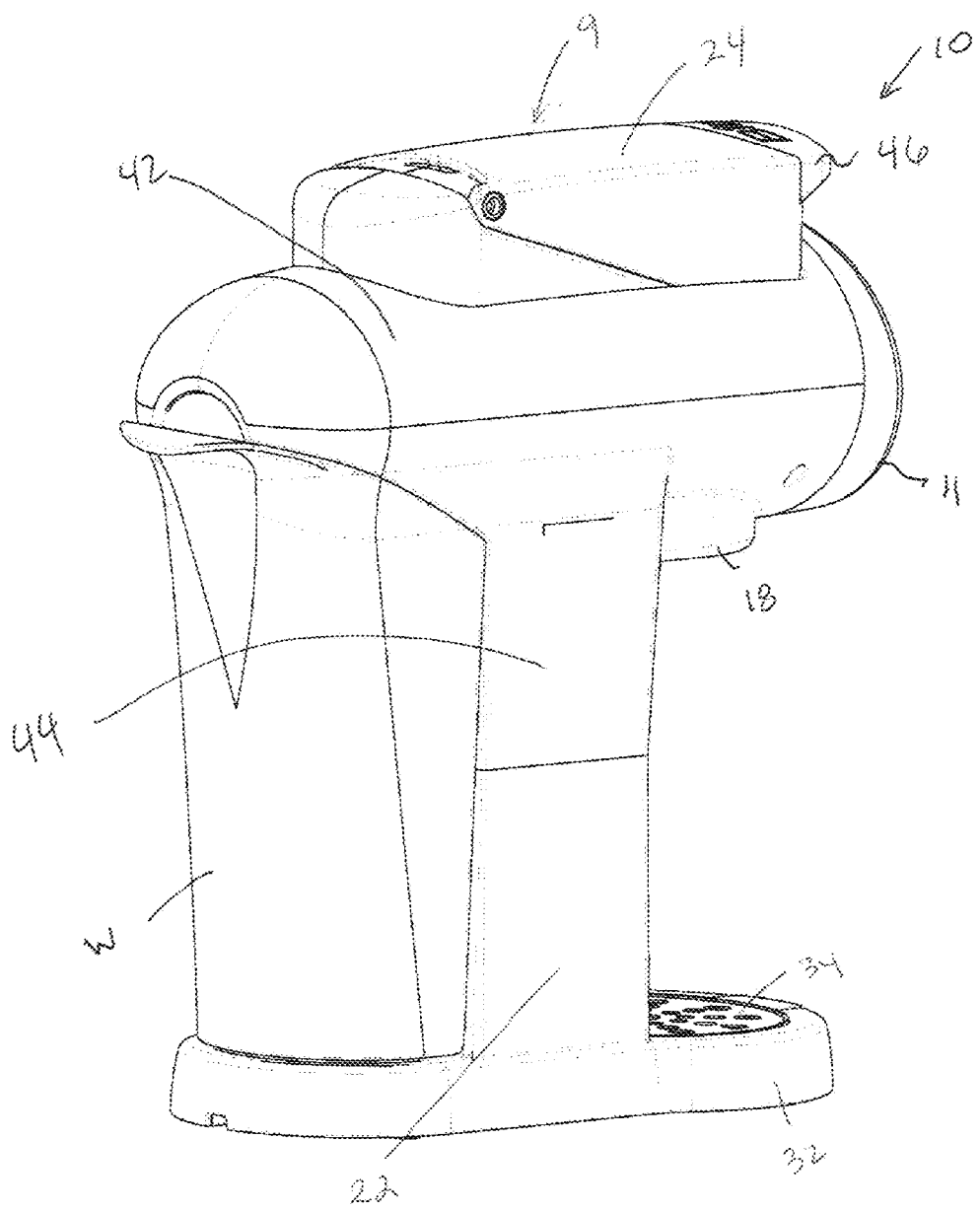
FIG. 2 depicts a rear perspective view of the beverage dispenser of FIG. 1, with the cover in a closed position.
Figure 3:
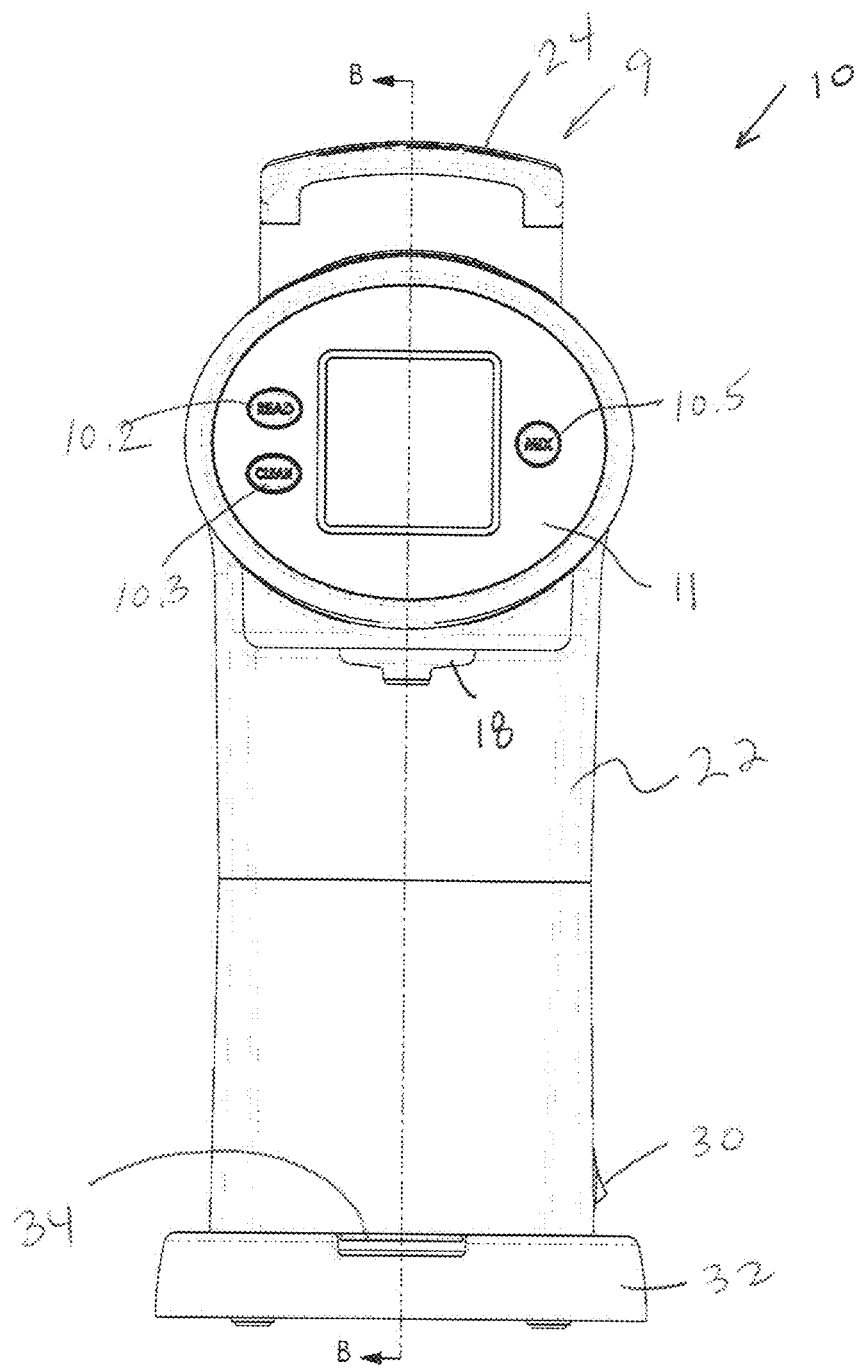
FIG. 3 depicts a front view of the beverage dispenser of FIG. 1, with the cover in a closed position.
Figure 4:
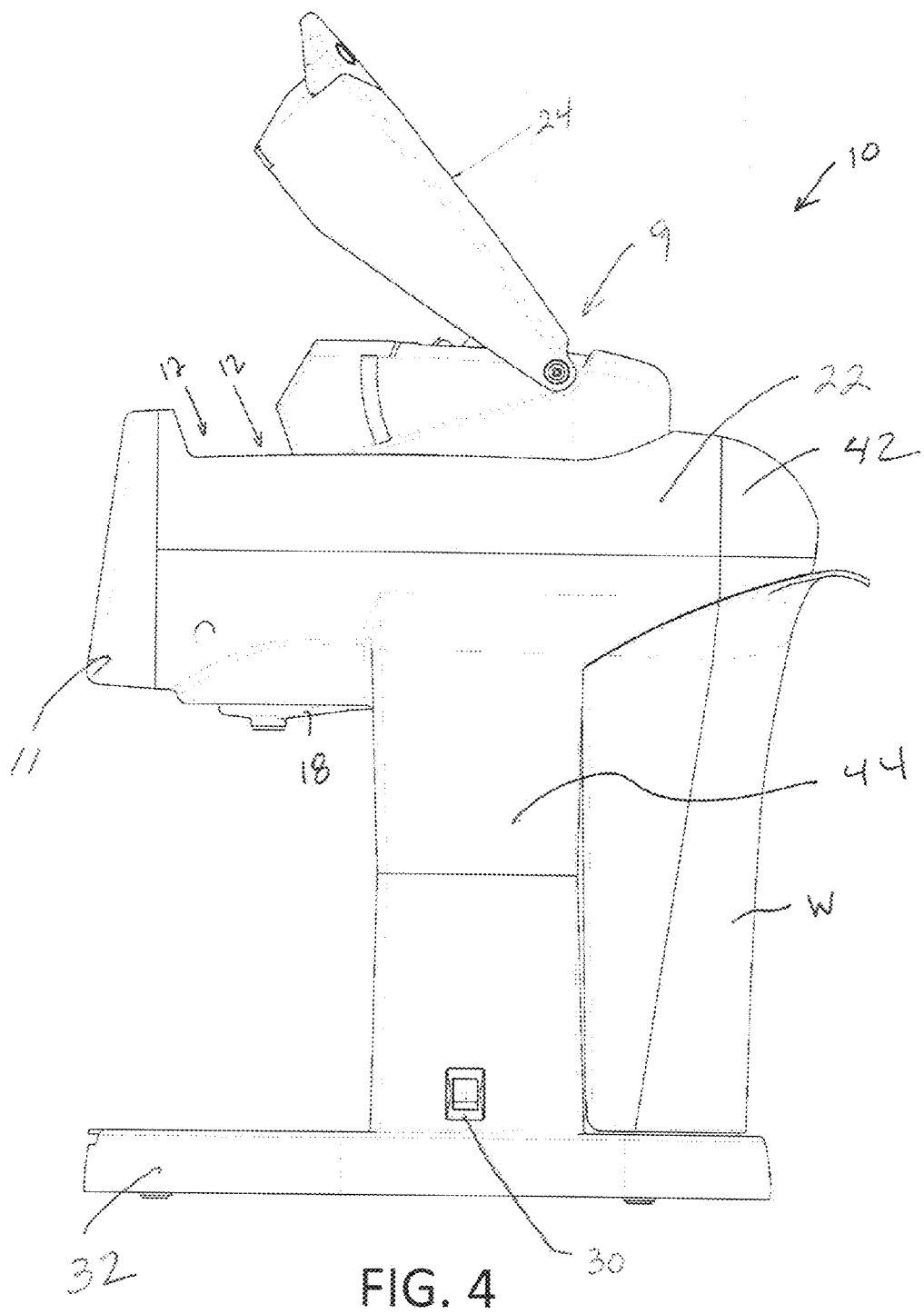
FIG. 4 depicts a side view of the beverage dispenser of FIG. 1 with the cover in an open position.

Consumers enjoy trying mixed drinks. Drink specialty menus are very popular at most restaurants. However, specialty drinks are often expensive to purchase. Consumers often would like to try specialty drinks at home, but it can be costly to purchase all the ingredients. In addition, consumers need to find recipes on their own. The cold beverage dispenser 10 described herein provides a solution for consumers to be able to make many different kind of drinks, including specialty drinks, without having to find a recipe and mix various ingredients together. The example dispenser 10 described herein allows a consumer to make a "perfect" drink every time without having to buy multiple bottles of ingredients and alcohol.

FIGS. 1-4 depict an example beverage dispenser 10. The device 10 is an on-the-counter machine targeted to the casual cocktail market for people who want to try a variety of drinks, but don't necessarily want to invest in large amounts of expensive ingredients. In this example, the machine 10 is single-serve and permits a consumer to mix a wide variety of ingredients together to make a cocktail. The machine 10 depicted has two receptacles 12 for receiving ingredient containers 14, as well as a reservoir W for holding water. (More receptacles could be provided if desired). The receptacles 12 are configured to accept single serve containers 14 that include liquid ingredients. The containers are shown as being in pouch form and have a thin wall that is conducive to slicing. Alternatively, the containers 14 could hold powder ingredients.

By utilizing multiple containers 14 in multiple receptacles 12, the consumer has the ability to create hundreds of cocktails. The containers 14 may include cocktail mixers (such as juice and other ingredients) or alcohol products (such as vodka, gin, whiskey, and the like). A typical cocktail can be made using one alcohol container 14a and one mixer container 14. The containers 14 are input separately into the receptacles 12 in the dispensing machine 10 and the alcohol is typically not mixed with the mixers prior to activation of the machine 10, although there may be some formulations where alcohol is mixed with a mixer in the container 14. The size of the containers 14 may vary relative to the alcohol pouches and relative to what is required in order to make a drink recipe. Although an initial embodiment of the beverage maker 10 is an on the counter-type device, the device 10 may alternatively be an on-the-floor device or have different sizes depending upon the application.

The containers 14 are formulated so that they allow the consumer to make the "perfect" drink every time because the mixers are proportioned to exactly match the amount of alcohol in the alcohol container 14. This allows the consumer great ease to try a variety of drinks, mixed perfectly, in their own home. No measuring of ingredients is needed. The consumer only has to insert the containers 14 into the receptacles 12 and let the machine 10 prepare the cocktail.

The Alcohol and Tobacco Tax and Trade Bureau (TTB) regulates the labeling, advertising and marketing of alcoholic beverages in the United States. Wine and liquor may only be sold in standard sizes. Some jurisdictions provide different rules depending on the strength of the alcohol. The smallest size bottle of distilled spirits permitted to be sold in the United States is referred to as a miniature and has a size of 50 ml or 1.7 ounces. A typical shot that is dispensed in US bars is between 1 ounce and 1.5 ounces. The "shot" dispensed in connection with the subject dispenser 10 is 1.7 ounces in order to conform to US sizing standards. This may change over time if federal regulations change. Other sizes may be used in other jurisdictions, with the size of the "shot" not being limited to 50 ml. The mixers utilized with the dispensing device 10 are formulated for use with 1.7 ounces of liquor. If a different size "shot" is permitted to be sold, then the mixers can be adjusted based upon the quantity of alcohol in the "shot" container. Double shots of alcohol may be used by either using a larger container 14 in the receptacle 12 or by using two alcohol containers 14, each having 1.7 ounces of alcohol. In one example, the dispenser 10 may have the capacity to make a "double" so that 3 ounces of alcohol are used at minimum, along with about 8 oz. of mixer. Alcohol may be dispensed as a precisely measured mixologist bartender shot, if desired and permitted under local laws.

The dispenser 10 of FIGS. 1-4 includes a housing 22, a water reservoir W, a cover 24, multiple receptacles 12 for receiving containers 14, a cutter assembly 9, a display panel 11, an on/off switch 26, and a catch tray 30. The catch tray 30 may include a liner 32. The display panel 11 includes an LED screen 10.8 that may be back lit. The display panel 11 includes a "mix" button 10.5, a "clean" button 10.3, and a "read" button 10.2. Other buttons may also be provided. As shown, the containers 14 are pouch-shaped and are inserted substantially vertically. In one embodiment, the containers 14 are inserted at an approximately 20 degree angle so that they lean forward against part of the housing 22 once installed.

Figure 5:
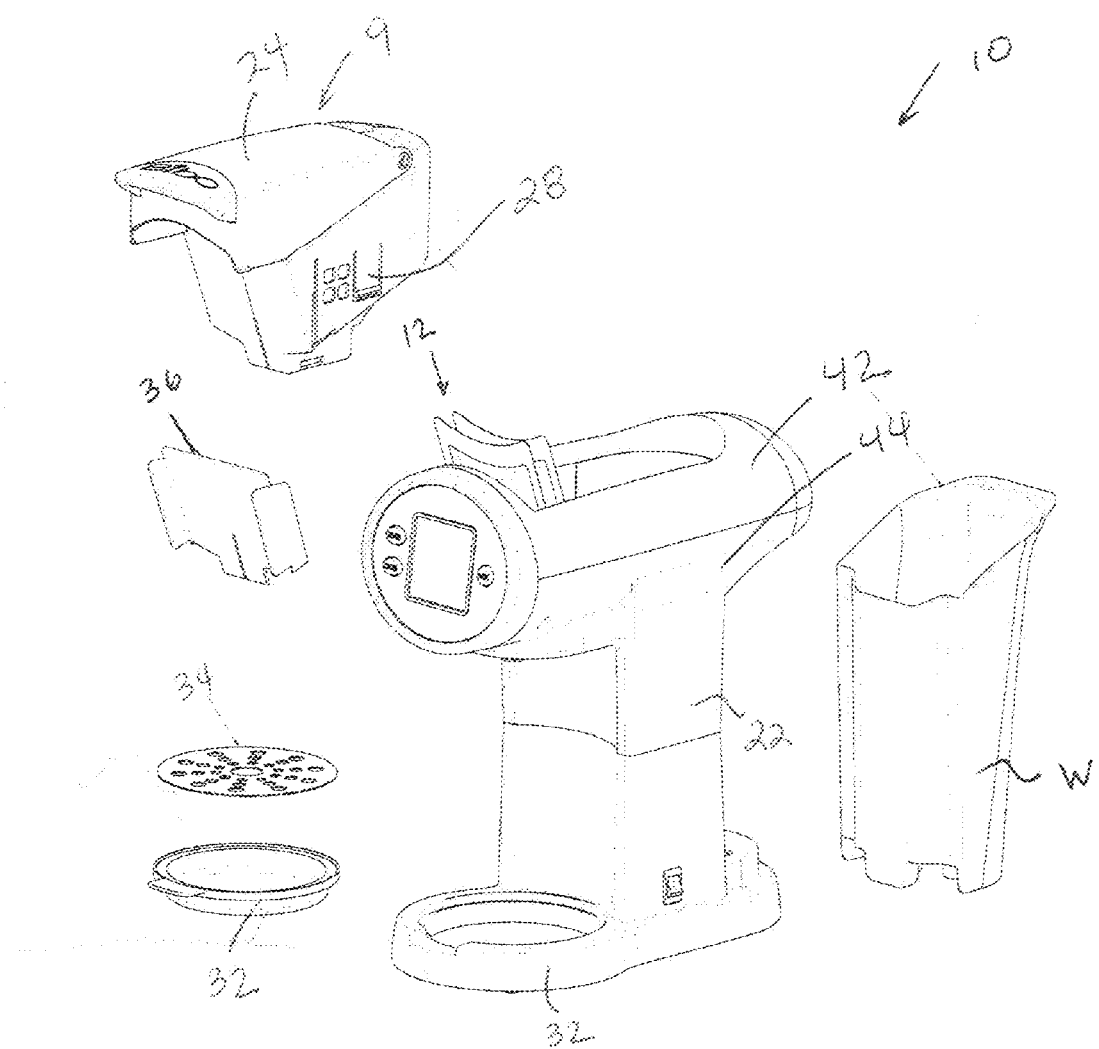
FIG. 5 depicts an exploded view of the beverage dispenser of FIG. 1 showing the cutter assembly (cassette) removed from the body of the dispenser.

FIG. 5 depicts an exploded view of the dispenser 10 showing the various parts of the dispenser 10 that can be disassembled by a user for cleaning or otherwise. The display 11 and housing 22 are coupled together. The cutter assembly 9 is a cassette that can be removed for cleaning. The housing 22 contains ridges or other surfaces (not shown) for receiving the cutting assembly 9. A clip 28 may be positioned on the sides of the cutting assembly 9 for coupling with a groove (not shown) inside the housing 22 in order to hold the cutting assembly 9 in position in the housing 22. A divider 36 is also provided between the first and second receptacles 12. The divider 36 may be removable from the housing 22 and is used to separate the two containers 14 in order to provide receptacles 12 for receiving both containers 14 in the housing 22. The divider 36 has a slot 38 through which a cutting blade 40 can move horizontally. The divider 36 may be positioned in the housing 22 to abut grooves or slots (not shown) in the housing 22 interior. The divider 36 may be coupled in any known manner to the housing 22.

A water reservoir W is positioned on a rear end of the housing 22 and is removable therefrom. A pump 17.1 (not shown in FIG. 5) is coupled to the water reservoir W and is used to pump water through the housing 22 in order to mix the water with ingredients stored in the containers 14. The housing 22 also includes a well 32 that has an overflow plate 34 that is positioned in the well 32 for catching any overflow from the dispenser 10. The well 32 is positioned at the dispensing end of the device 10 and is positioned below the funnel 18 through which liquid ingredients travel. The well 32 may include a drain lid 34 that is used for positioning a glass 16 on the drain 34 in order to keep the bottom of the glass 16 out of the well 32. Both the overflow well 32 and the drain lid 34 may be removable. The water reservoir W is removable in order to permit refilling of the reservoir with water. The water reservoir W may have a switch that signals to the user that the reservoir W is low on water.

Figure 6:
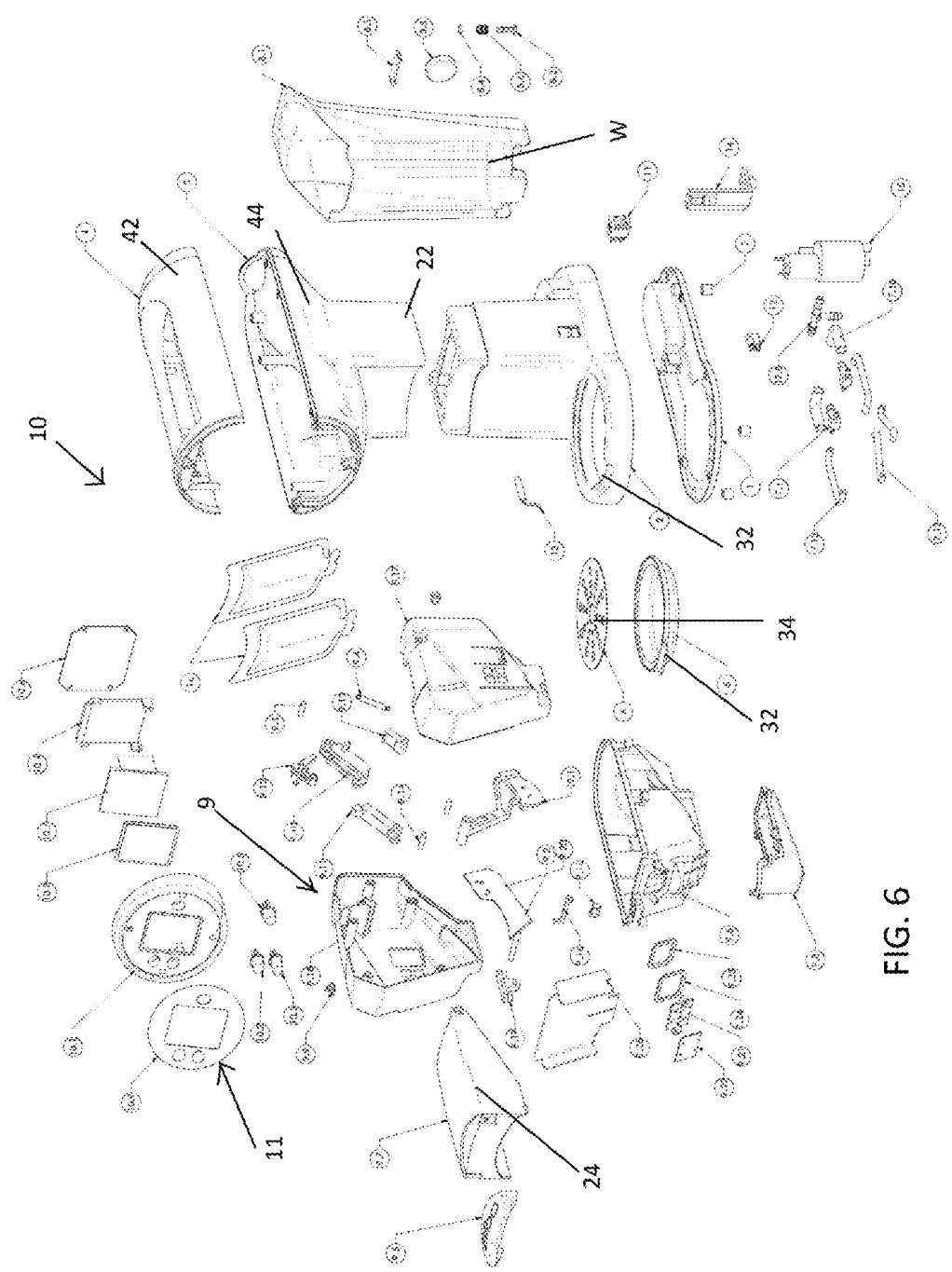
FIG. 6 depicts an exploded view of the various internal parts of the beverage dispenser of FIG. 1.

FIG. 6 depicts a variety of parts as discussed in greater detail above and below. FIG. 6 shows the parts associated with the display panel 11, including switches associated with the read 10.2, mix 10.5 and clean 10.3 buttons. FIG. 6 shows various parts of the housing 22, including an upper housing portion 42 and a lower housing portion 44. The upper housing portion 42 is broken into two parts, and a large opening is provided in the upper housing 42 in order to accept the cutter assembly 9 therein. A sensor is associated with the water reservoir W in order to identify when the reservoir W is running low on water. The cutter assembly 9 is shown in exploded view, including the cover 24 and a decorative member 46 that couples to the cover 24. The decorative member 46 may include a brand name, among other features, such as instructions. Features relating to the water lines 17.12, 17.13, 17.10 and water pump 17.1 are also depicted. In addition, a system for reading the pouches 9.21, 9.22, 9.23, 9.24 is also provided. Some of these features will be discussed in greater detail below.

Figure 7:
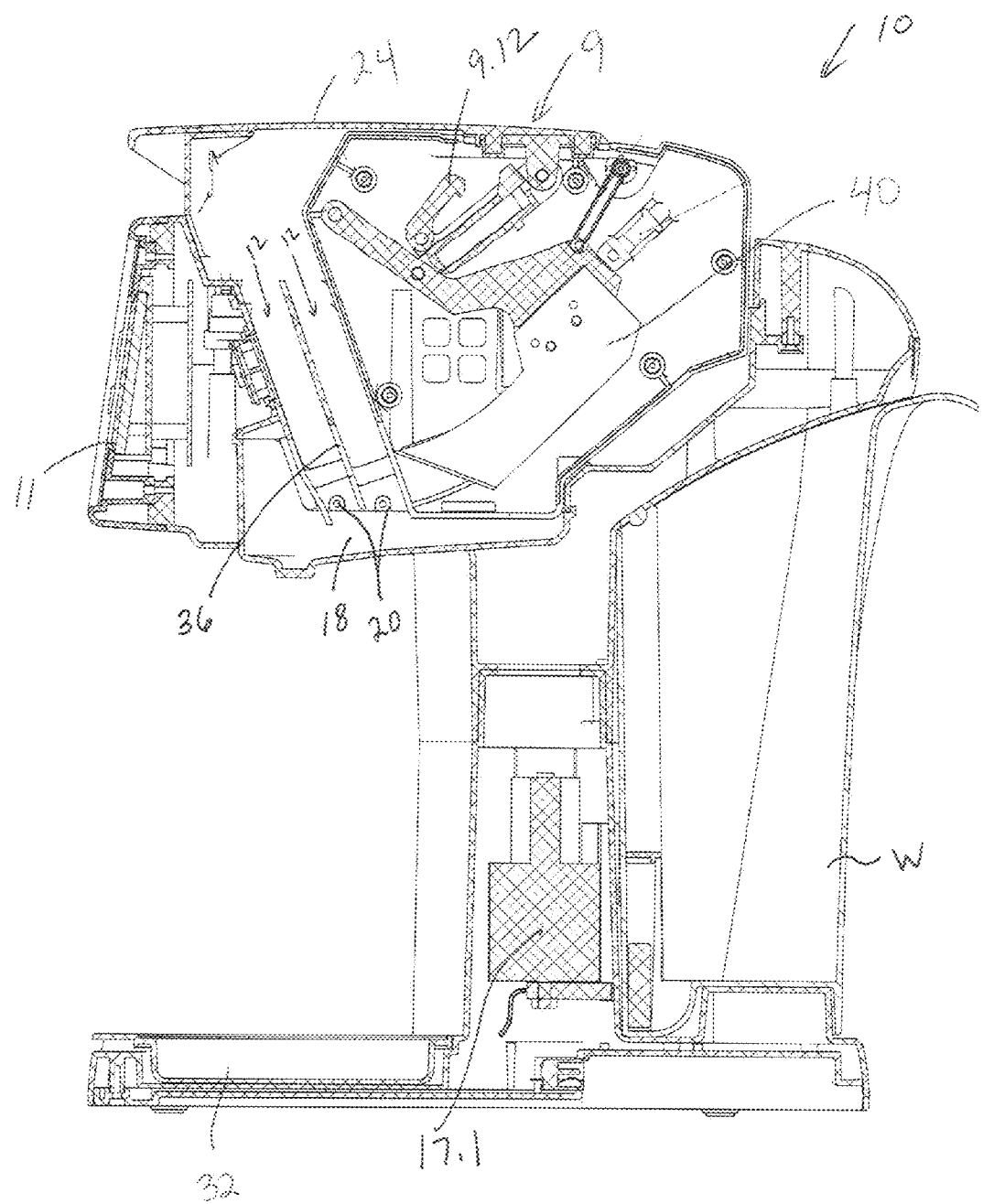
FIGS. 7-13 depict cross-sectional side views of the cutting sequence for the cutting assembly of the example beverage dispenser of FIG. 1.

FIGS. 7-13 depict the operation of the device 10 through a full sequence that involves inserting the containers 14 and cutting them so that liquid can be dispensed. FIG. 7 shows the device with the cover 24 closed and without any containers 14 positioned in the receptacles 12.

Figure 8:
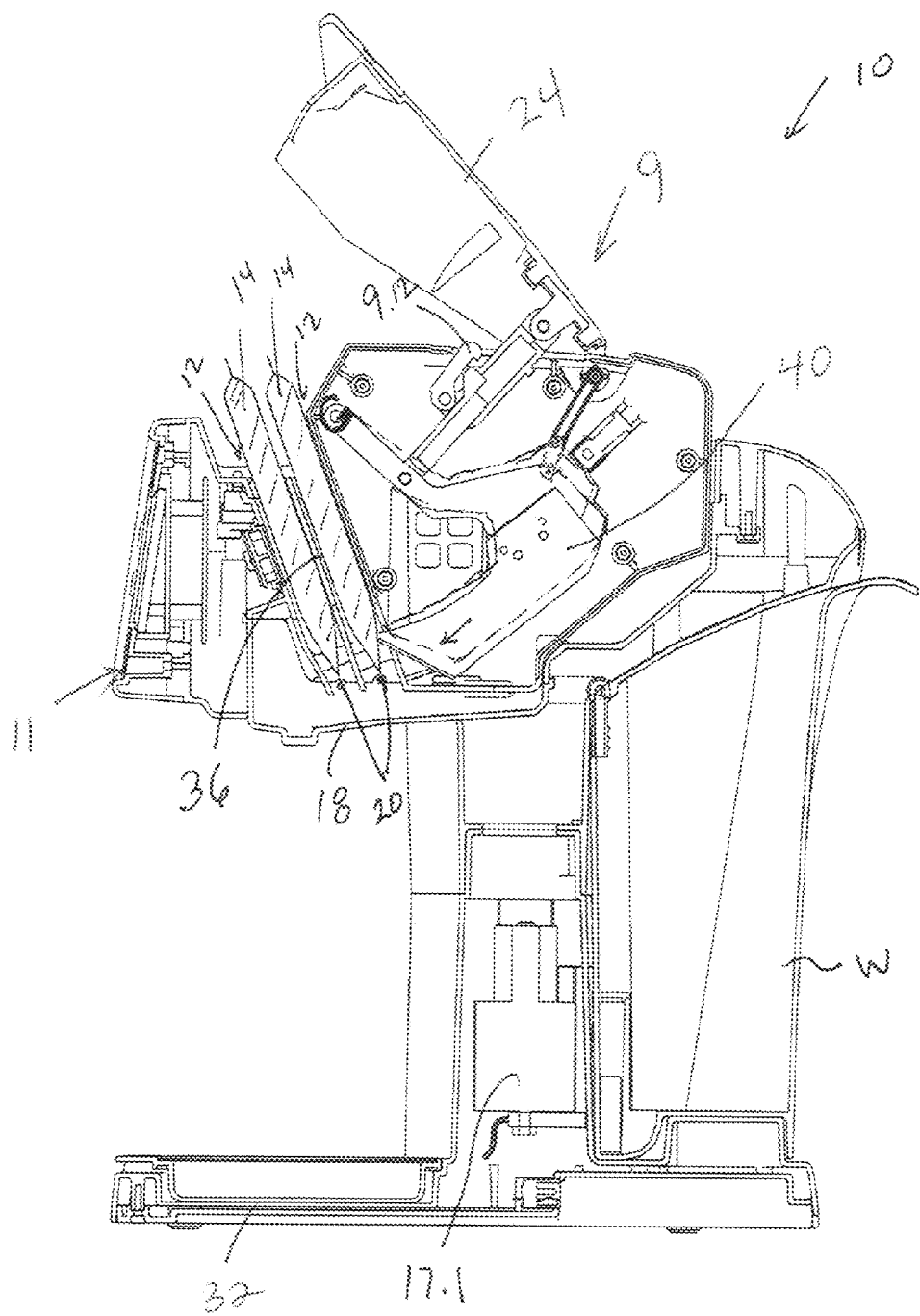

In order to use the device, the user opens the cover 24 and inserts containers 14 into the receptacles 12, as shown in FIG. 8. The cutter assembly 9 seats in the housing 22 adjacent the receptacles 12. In addition, a removable divider plate 36 is positioned in the receptacle slot 12 in order to delineate two separate receptacles 12. The cover 24 is connected to the cutter assembly 9 by a post 9.11 and a receiver 9.10. The post 9.11 is connected to the cutting arm 9.1 and cutting blade 40 and the receiver 9.10 is connected to the lower side of the cover 24 and is pivotable relative to the cover 24. A pawl 9.12 is positioned between the post 9.11 and the receiver 9.10 and is use to govern the motion of the cutting blade 40. The post 9.11 is slidably received within the receiver 9.10.

FIG. 8 shows the blade 40 before it moves forward to slice the containers 14 and shows slight movement inwardly. The interior of the cutter assembly 9 includes a stop block 9.13, which stops the rearward movement of the cutting blade 40. The interior of the cutter assembly 9 also includes a spring 9.4 that is connected to the cutter arm 9.1. The spring 9.4 returns the cutter arm 9.1 to a non-extended position after cutting has occurred. The cutting blade 40 is connected to the cutter arm 9.1. The blade 40 is configured to rotate about an axis that is defined by the pivot point of the cutting arm 9.1 relative to the cutting assembly housing. The cutter arm 9.1 rotates about this pivot point when the cover 24 and post 9.11 move. A pawl 9.12 is used to lock the position of the post 9.11 relative to the receiver 9.10 such that when the cover 24 is closed, the post 9.11 is fixed in position relative to the receiver 9.10, thereby permitting the cutter arm 9.1 to rotate. FIG. 8 shows the cover 24 and pawl 9.12 before the pawl 9.12 is fully engaged. The pawl 9.12 must be fully engaged before cutting occurs.

Figure 9:
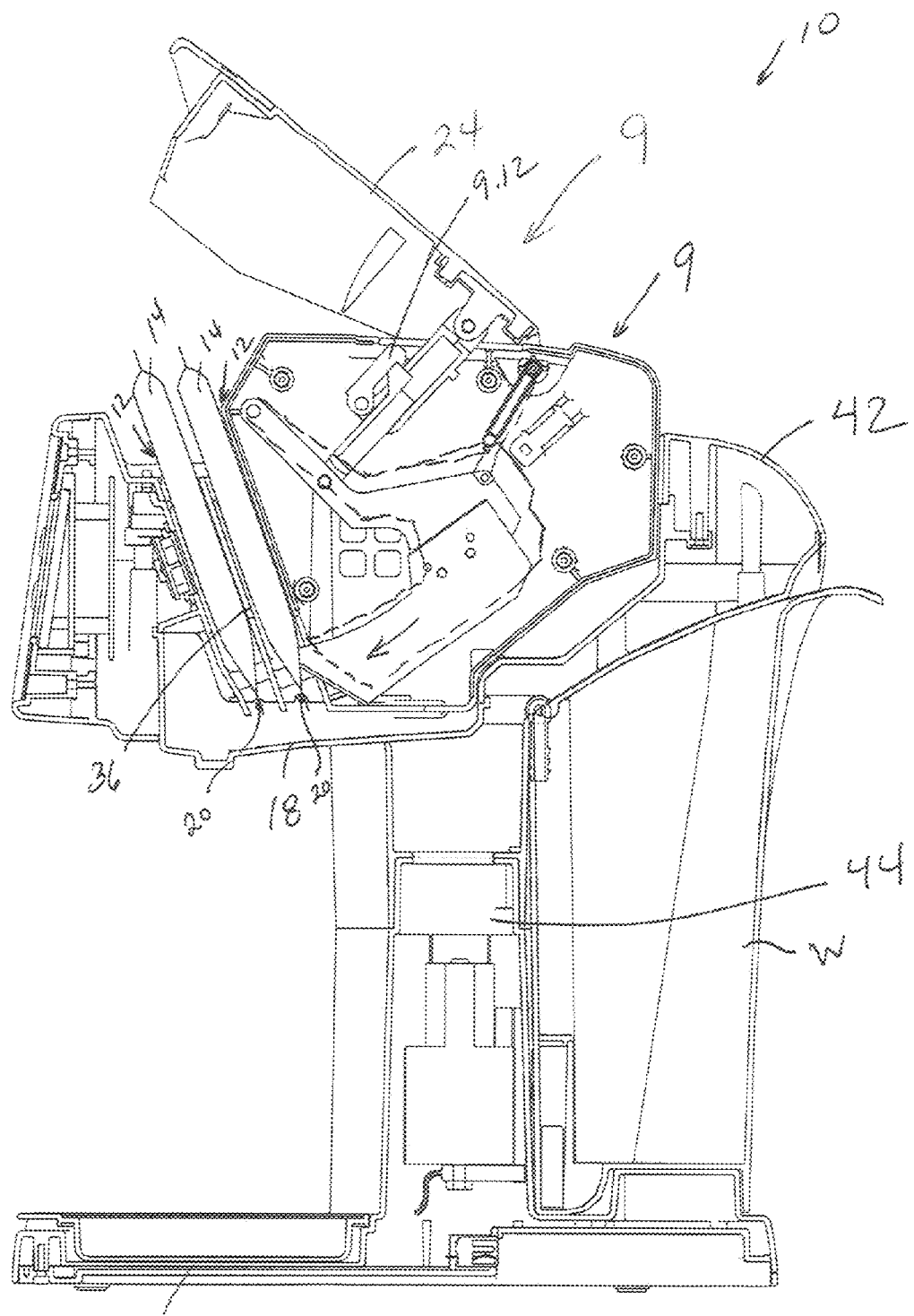
Figure 11:
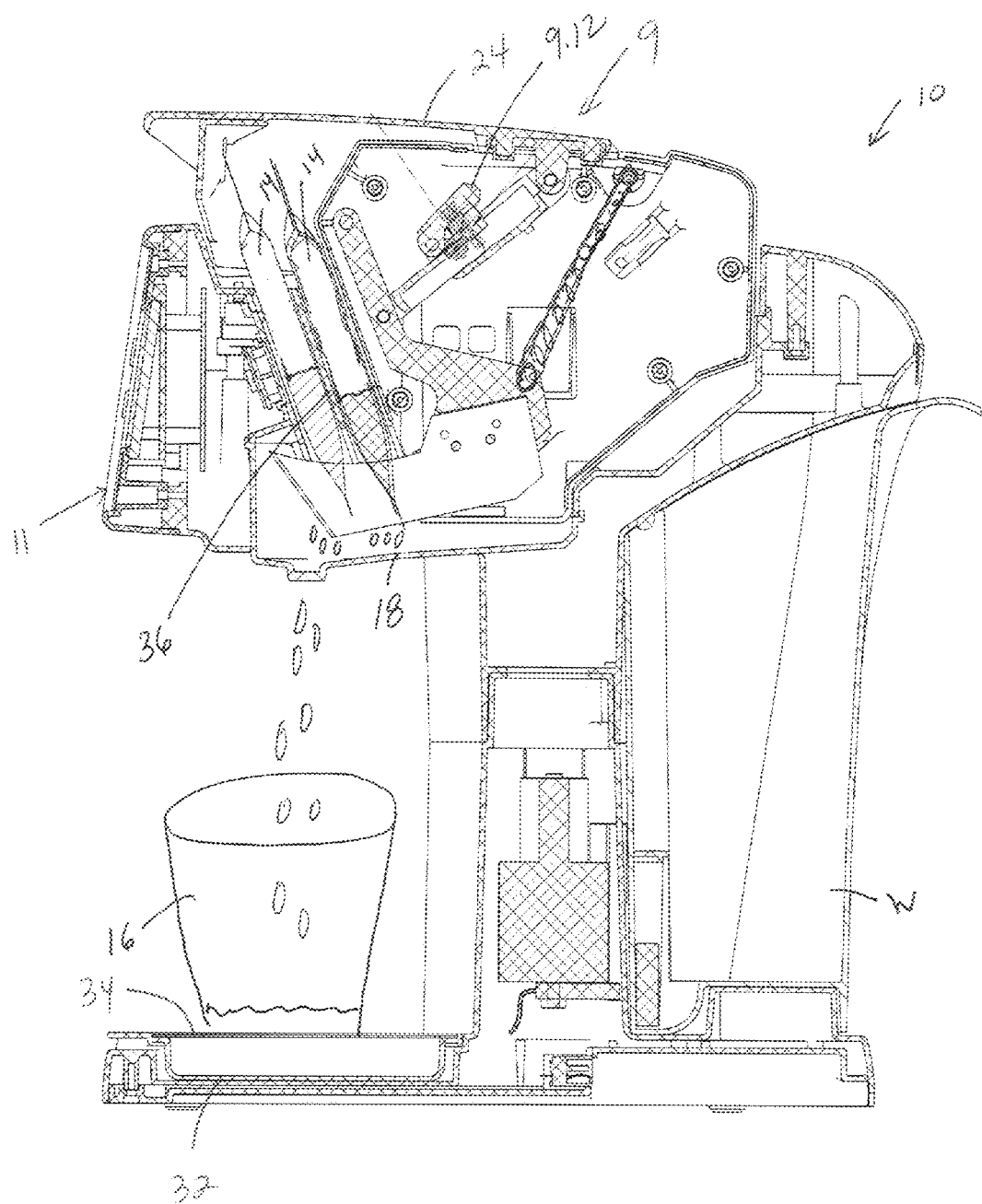

FIG. 9 shows the cover 24 and pawl 9.12 once the pawl 9.12 is fully engaged and locked in position, but before the cover 24 is closed. The pawl 9.12 engages a ledge 48 on the post 9.11 and seats on the ledge 48 until a knob 50 on the receiver 9.10 knocks an arm 56 on the pawl 9.12 off the ledge 48 (see FIG. 16 for greater details concerning construction of the pawl 9.12). In this position, when the user closes the cover 24, the post 9.11, pawl 9.12 and receiver 9.10 will act together against the force of the spring 9.4 to permit the blade 40 to travel forwardly in a substantially horizontal manner in order to cut open the containers 14 that are positioned in the receptacles 12 and to release the contents therefrom, as shown in FIG. 11. FIG. 9 shows two positions for the cutting blade 40. A first position is before the cover 24 is closed, when the cutter arm 9.1 abuts the stop 9.13, and a second position shows the cutting blade 40 rotated slightly forwardly. This would occur as the cover 24 is closed. Because the pawl 9.12 locks the post 9.11 and receiver 9.10 together, when the cover 24 is closed, the post 9.11 and cutter arm 9.1 move forward. Since the cutting blade 40 is fixedly attached to the cutter arm 9.1, the blade 40 also moves forward in order to slice through both containers 14 simultaneously. The blade 40 travels through a slot 38 in the divider plate 36.

Figure 10:
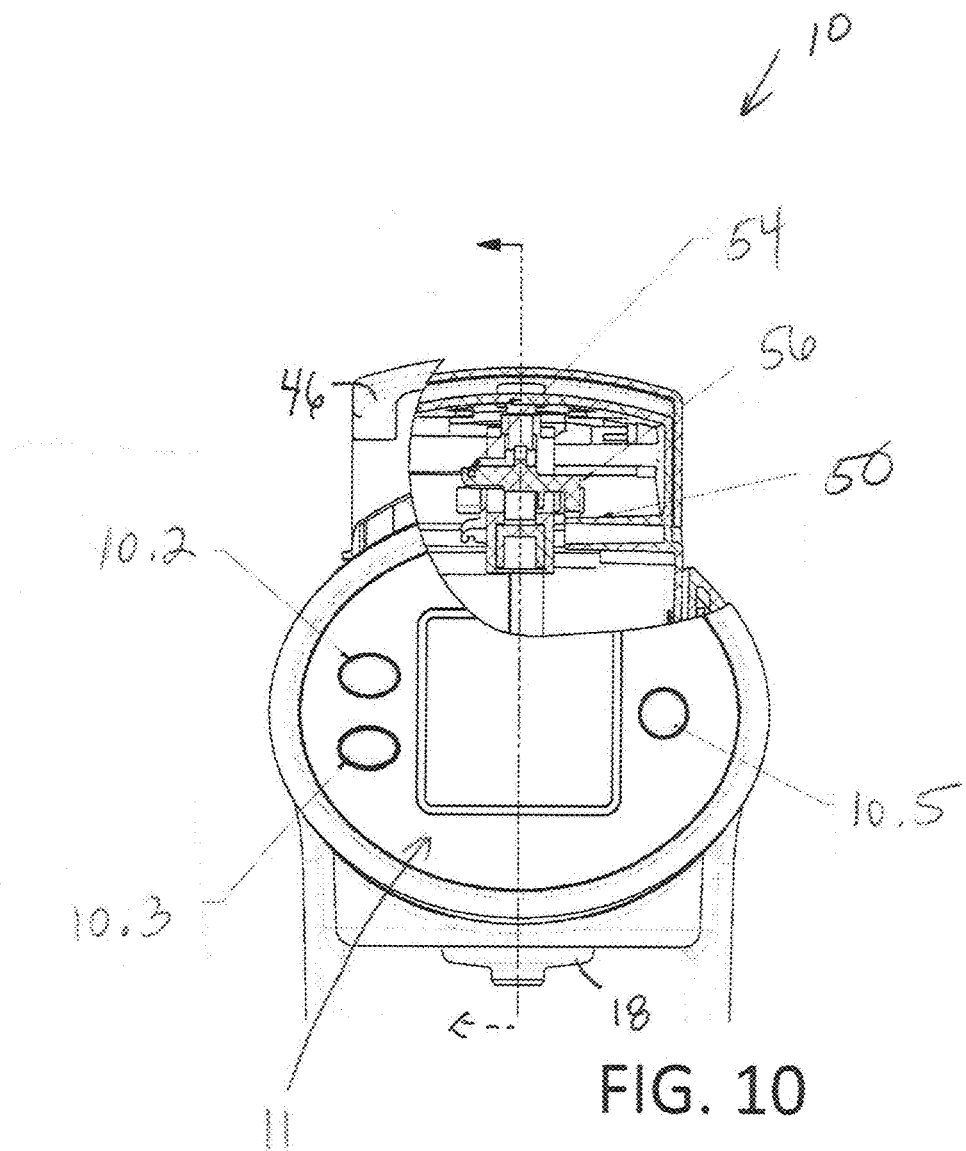

FIG. 10 shows the position of the pawl 9.12 in a locked position from a front view. The pawl 9.12 includes a return spring 54 that helps to return the pawl 9.12 to an unlocked position. In addition, the pawl 9.12 includes a release arm 56 that acts upon a release knob 48 that is positioned on the receiver 9.10. As shown, the post 9.11 is positioned inside the receiver 9.10.

Figure 14:
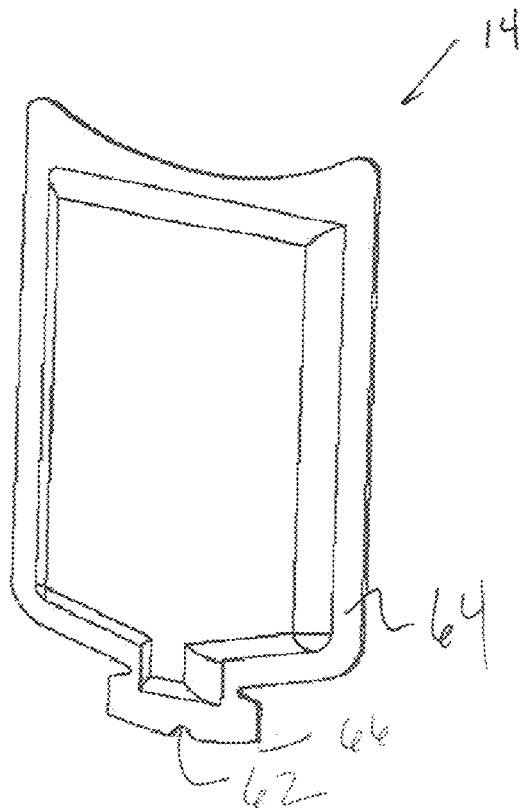
FIG. 14 depicts a perspective view of an example beverage or alcohol pouch for use with the beverage dispenser.
Figure 15:
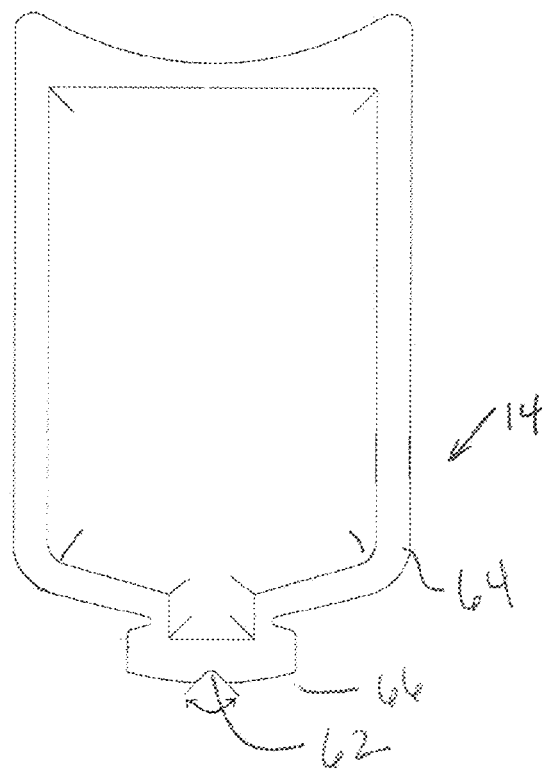
FIG. 15 depicts a front view of the example pouch of FIG. 14.

FIG. 11 shows the cutting assembly 9 after the blade 40 has traveled forward. In this position, the return spring 9.4 is fully extended and acts on the cutter arm 9.1 to pull it rearwardly after the pawl 9.12 is released. As is evident, the cutting blade 40 moves forward in a substantially horizontal movement. There is some vertical displacement during the movement, but a significant part of the movement is in a horizontal and forward direction. The movement is also a swinging movement since the pivot point for the cutter arm 9.1 is above the blade 40. The blade 40 has an angled, sharpened leading edge 60. The angled edge assists in initiating the cutting. The containers 14, or pouches, are shown in greater detail in FIGS. 14 and 15. As shown in FIGS. 14 and 15, the downwardly facing end of each pouch 14 includes a notch 62. A tip of the cutting blade 40 enters the containers 14 above this notch 62 and, because of the angle on the leading edge of the cutting blade 40, the blade 40 cuts downwardly as it travels forward until it cuts through the rim 64 of the containers 14. The notch in the containers 14 helps to remove material from the rim area 64 permitting easier cutting of the container 14. The blade 40 may be coupled to the cutter arm 9.1 in any known manner. The cutting blade 40 may be metal while the cutter arm 9.1 is plastic, or other suitable materials.

Figure 12:
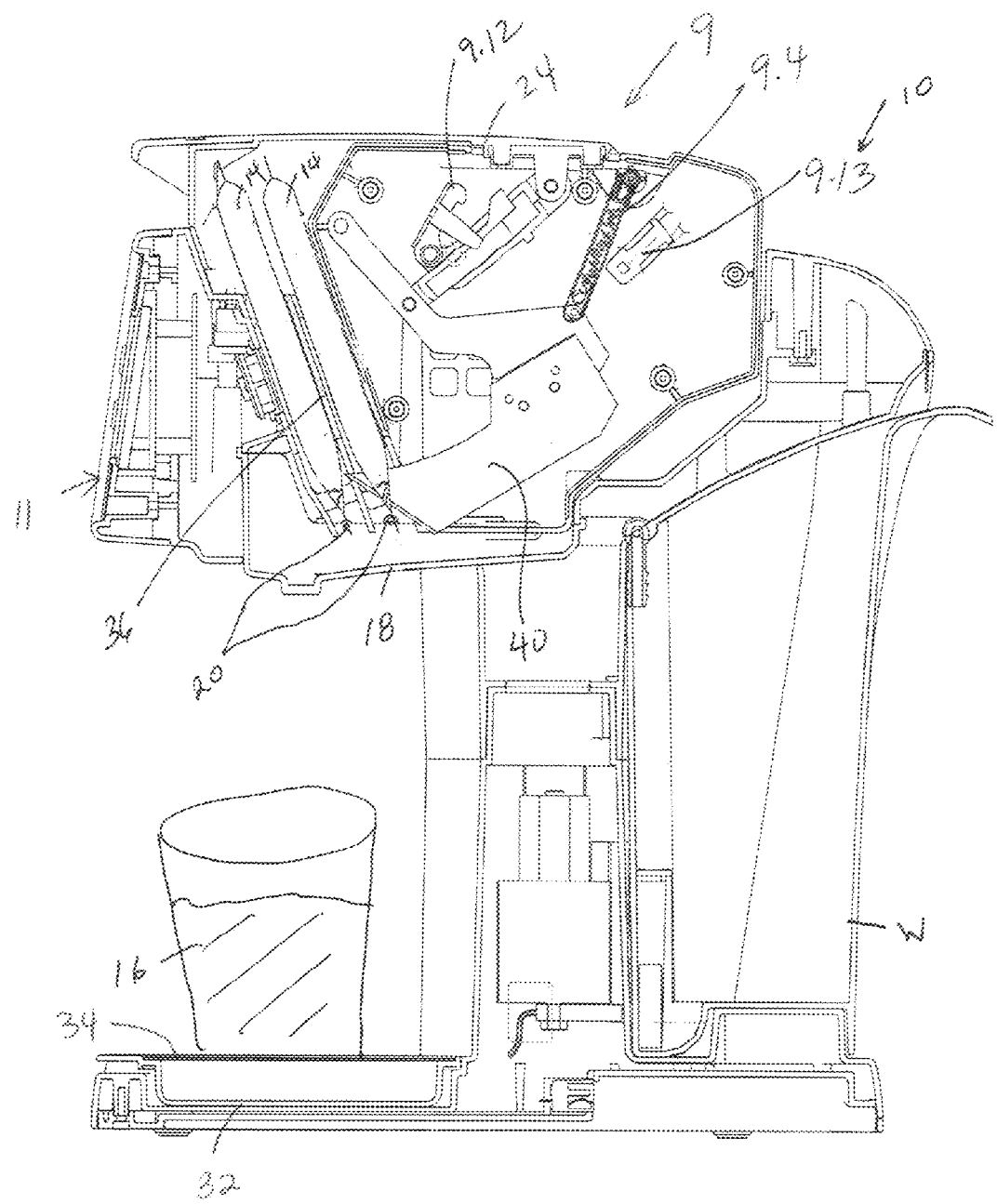

FIG. 12 shows the pawl 9.12 after it has begun to be released and rotated in order to permit the post 9.11 to move relative to the receiver 9.10. The return spring 9.4 is partially extended in this position and is in the process of pulling the cutting blade 40 rearwardly. Because the cutting blade 40 has already traveled through the containers 14, the containers 14 have substantially completely evacuated. There may be some residual liquid remaining in the containers 14 that is negligible. The return spring 9.4 will pull the cutter arm 9.1 rearwardly until a back end of the cutter arm 9.1 abuts the stop 9.13. In this position, the cutting blade 40 will be fully retracted, as shown best in FIG. 13. In addition, pawl 9.12 is in a fully disengaged position. The user must open the cover 24 in order to re-engage the pawl 9.12. Since the containers 14 at this point will be spent, they will need to be removed in order to permit a user to make another drink. The cover 24 will be opened and the containers 14 can be pulled out of the receptacles 12 and disposed of.

The example drink dispenser 10 takes multiple containers 14 of material, adds water and dispenses them into a cup 16. The funnel 18 serves as a mixing chamber for the ingredients in the containers 14, as well as a station for mixing water with the contents of the containers 14. Water nozzles or outlets 20 are provided at the bottom of the receptacles 12. The water outlets 20 are coupled to a pump 17.1 and the water reservoir W and are used to mix water with the contents of the containers 14. In addition, the water outlets 20 are used to help clean and rinse the funnel 18 and the various parts within the interior of the device 10 without having to remove the cutting assembly 9 or divider plate 36. The water outlets 20 are positioned on both sides of each receptacle 12. They work together to create a swirling pattern within the funnel 18 in order to help mix the ingredients and to help clean the interior when no containers 14 are inserted.

As discussed above, the display 11 includes a button for "mix" 10.5 and "clean" 10.3. The "mix" button 10.5 is pressed after the cover 24 is closed in order to dispense water from the water reservoir W. The "mix" button 10.5 is tied to a control system that will meter an appropriate amount of water for the particular containers 14 used. The mix button 10.5 may also be tied to a read function 10.2 such that upon reading the type of container 14 used, the control system can determine how much water to add.

A "read" button 10.2 can be used to read the types of pouch or pouches inserted and can be used to instruct a user as to what type of alcohol pouch to insert when a mixer pouch is installed. In addition, once the reading occurs, the control system knows what type of beverage is being made and can determine how much water to add to the system. The read 10.2 and mix 10.5 functions could be performed by the same button, if desired.

The "clean" button 10.3 is pressed when no containers 14 are present in the receptacles 12 in order to rinse or clean the interior of the device with water. In addition, the cutter assembly 9 and divider plate 36 are removable from the housing 22 and permit a user to easily clean the internal parts of the device 10 that come into contact with ingredients.

FIGS. 14 and 15 depict an example container 14 in the form of a pouch. The container 14 is appropriately sized to seat in one of the receptacles 12. Differently sized and shapes containers 14 may be used, if desired. The container 14 has a notch 62 formed at a top end 66. The top end 66 is inserted first into the receptacle 12 so that during use, the top end 66 faces downwardly. This notch 62 can aid in directing the cutting blade 40 through a center area of the pouch 14. The pouches 14 are preferably aseptic bags, lamination pouches, thermoformed containers 14, foil sealed containers 14, or the like that are used to hold the ingredients. This type of bag is readily known in the packaging industry and is used for such things as juice boxes and other liquids.

In one embodiment, a first container 14 holds the alcohol and a second container 14 holds the cocktail mixer. The containers 14 shown have a neck at an upper end. Other shapes could be utilized. For example a shape that is not direction specific could be used, if desired, such as a round, oval, rectangular, or other shaped pouch. In cases where a mixed drink is desired that requires the use of three containers 14 of liquid, the user can insert two of the containers 14 and then can tear the neck of the pouch and pour the contents of the third container into the cup 16.

Figure 13:
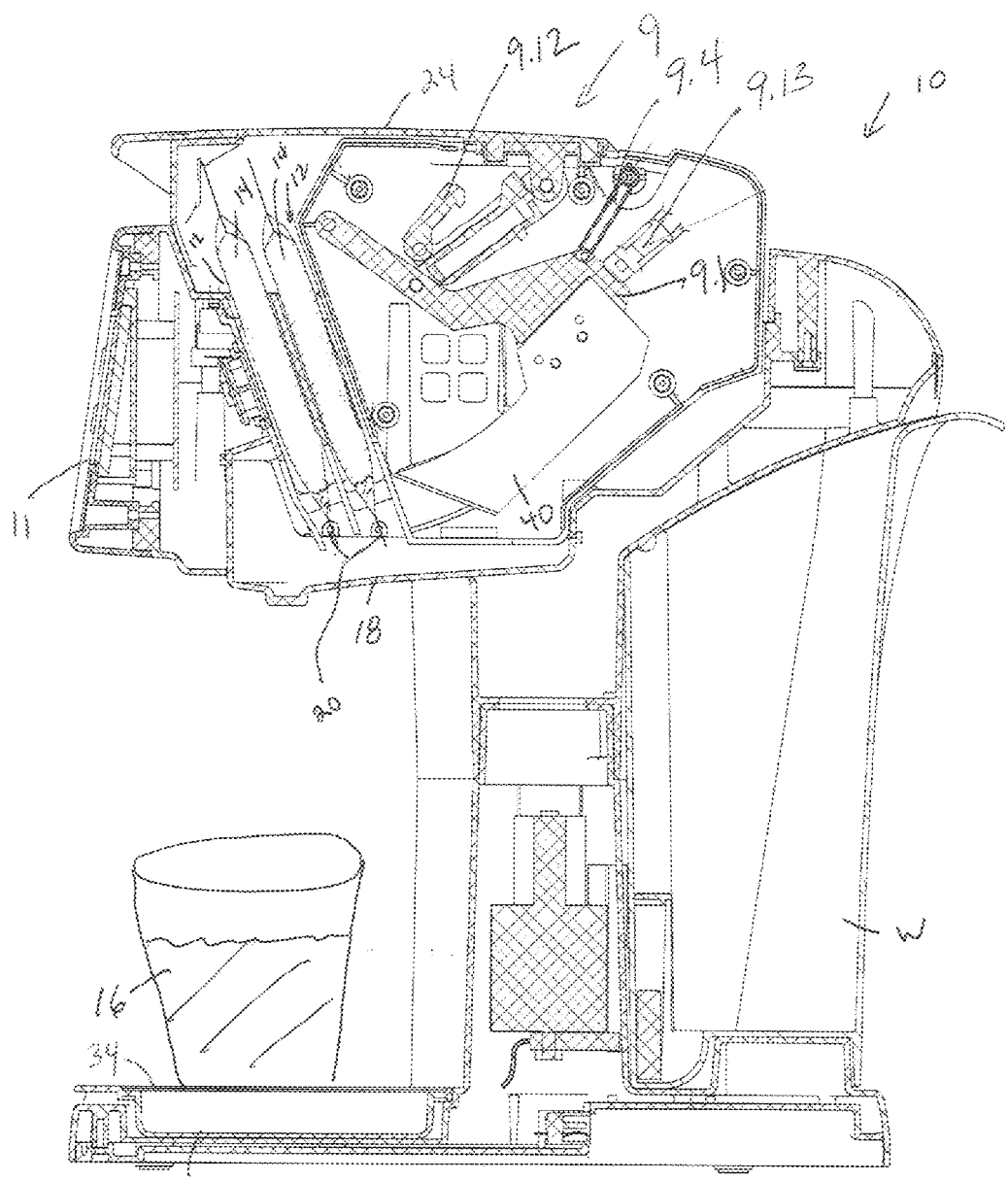

FIGS. 11-13 show a cup 16 placed under the funnel 18 so that when the cutting blade 40 opens the containers 14, the liquid can fall through the opening in the funnel 18 into the cup 16. As discussed above, water is introduced into the funnel 18 for mixing with the ingredients from the containers 14. Four water nozzles 20 are shown installed. A water nozzle 20 is positioned on opposite sides of each receptacle 12. The spray from the water nozzles 20 can be directed, if desired, to make a swirling pattern in order to clean the funnel 18 after the ingredients have been emptied into the funnel 18. The spray from the water nozzle 20 can also be directed at the cutting blade 40 in order to clean the cutting blade when it is still extended. Multiple ports or nozzles 20 may be used for introducing water into the funnel 18 at other locations, if desired. Four ports are shown, but other ports may also be used.

The pump 17.1 will meter out an appropriate amount of water to coincide with the ingredients in the containers 14 to make a cocktail, if desired. Alternatively, a fixed amount of water will be metered regardless of the type of containers 14 installed in the receptacles 12. Water may continue to be expelled from the nozzles 20 even after the fluid in the container 14 has been removed from the container 14 such that clean water runs through the funnel 18 at the end of the dispensing process. While not shown, water could also be dispensed directly into the funnel 18 to aid in washing the funnel 18 and in order to add more water to the mixture.

The device 10 may be designed so that water runs as soon as the cover 24 is closed, since that is when the cutting occurs. Alternatively, water may be dispensed from the reservoir W once the user presses a button, such as the "mix" button 10.5. A controller or processor (not shown) can be used to sequence the operation of the water pump 17.1 and the water pump can be controlled by a signal generated by pressing a button on the display 11. Alternatively, some of these functions can be done by hand.

The funnel 18 has a central opening 68 to deposit directly into an underlying glass 16. The opening 68 could be non-centrally located, if desired. FIG. 1 shows the containers 14 extending above a surface of the housing 22 in order to make it easier for the consumer to grab and pull the containers 14 from the housing 22 after they have been used. The divider 36 helps to guide the containers 14 into their respective slots. In addition, when multiple containers 14 are positioned in the receptacles 12, they can be easily removed by pulling them out at the same time from the top.

Figure 16:
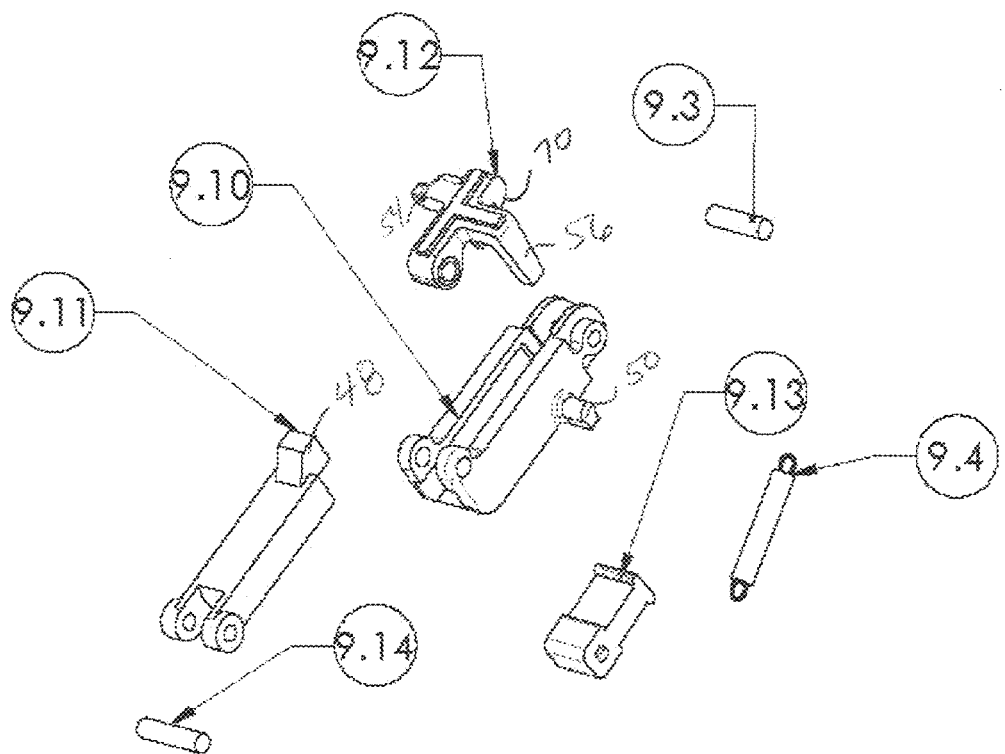
FIG. 16 depicts an exploded view of the pawl and post of the cover.

FIG. 16 depicts an exploded view of the post 9.11 and receiver 9.10 of the cutter assembly 9. As shown in FIGS. 8-13, the post 9.11 and receiver 9.10 are coupled to the cover 24 and move when the cover 24 is opened and closed. The post 9.11 slides inside the receiver 9.10 and includes a ledge 48 at an upper end thereof for mating with the pawl 9.12. The pawl 9.12 includes a tooth 70 at a top end thereof for abutting the ledge 48. The pawl 9.12 also has a release arm 56 that eventually engages with a knob 50 on the receiver 9.10 in order to release the tooth 70 of the pawl 9.12 from the ledge of the post 9.11. The cutter assembly 9 also includes a cutter arm 9.1 bumper 9.13 that is positioned inside the cutter assembly 9 and abuts the rear of the cutter arm 9.1 when in a retracted position. The cutter assembly 9 also includes a return spring 9.4 that couples to the cutter arm 9.1 and returns the cutter arm 9.1 to an unextended position once the pawl 9.12 is released from the post 9.11. A bottom end of the pawl 9.12 is pivotally coupled to a bottom end of the receiver 9.10.

The post 9.11 is fully extended relative to the receiver 9.10 when the cover 24 is opened. Once the cover 24 is opened, the pawl 9.12 engages with the tooth of the post 9.11. In this extended position, a downwardly extending arm 56 of the pawl 9.12 engages against the knob 56 on the receiver 9.10 so that when the cover 24 is closed, the post 9.11 and receiver 9.10 remain fixed. Once the cover 24 is closed, the blade 40 9.20 and arm 9.1 rotate forward and the return spring 9.4 pulls the arm 9.1 rearwardly, causing the pawl 9.12 to rotate into an unlocked position. This also permits the post 9.11 to be released relative to the receiver 9.10 so that the blade 40 9.20 can move into a retracted position.

Figure 17:
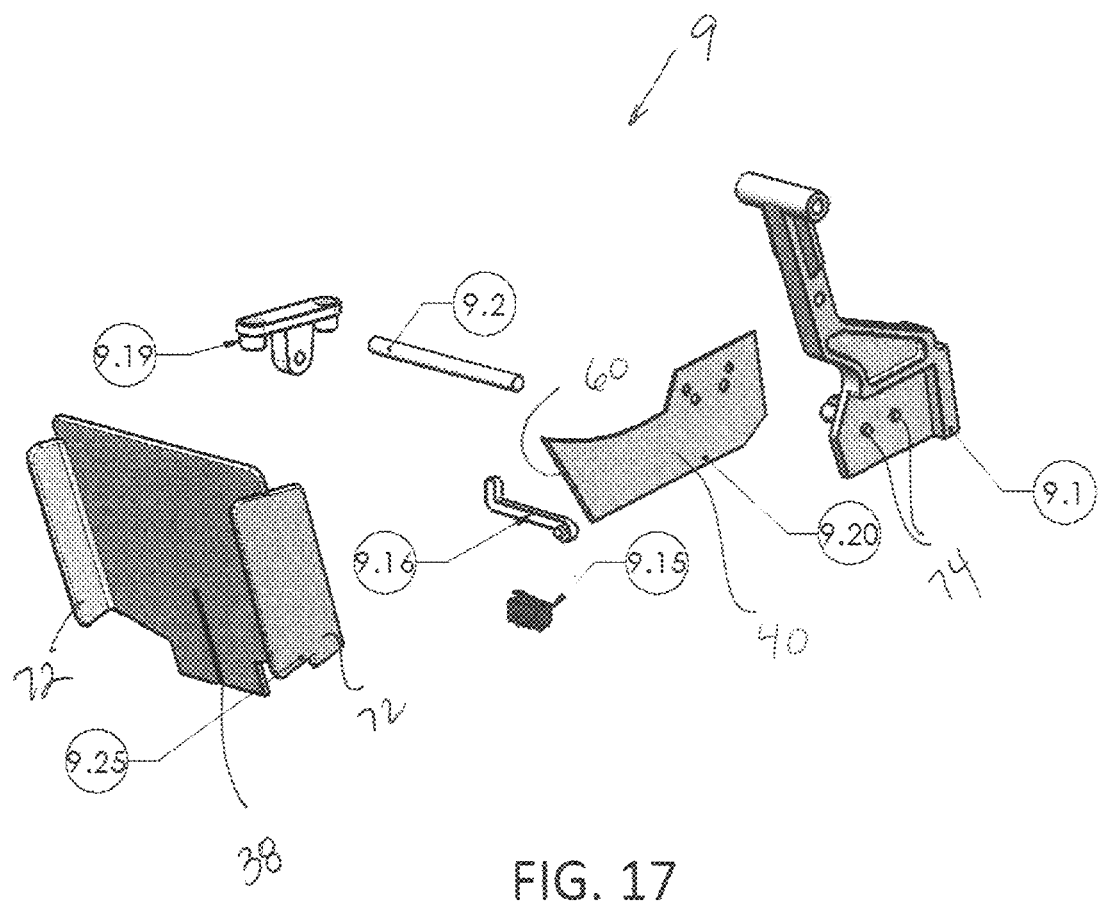
FIG. 17 depicts an exploded view of the cutter arm and blade.

FIG. 17 depicts an exploded view of other parts of the cutter assembly 9, as well as the divider plate 36, 9.25. As previously mentioned, the divider plate 9.25 forms a wall within the receptacle 12 in order to divide the receptacle into two parts, one for receiving each of the containers 14. The divider plate 9.25 includes wings 72 that are used to engage an interior surface of the housing 22 in order to hold the divider plate 9.25 in position. The divider plate 9.25 includes a vertical slot 38 that extends upwardly from a bottom end of the divider plate 9.25 that is configured to accept the forward motion of the cutting blade 40 9.20. The cutter blade 40 9.20 is engageable with the cutter arm 9.1 via posts 74 and is fixedly attached to the cutter arm 9.1. The cutter assembly 9 also includes a cover 24 switch finger 9.15, a hinge mount 9.19, a cutter arm 9.1 pin 9.2, and a D2F switch 9.15.

Figure 18:
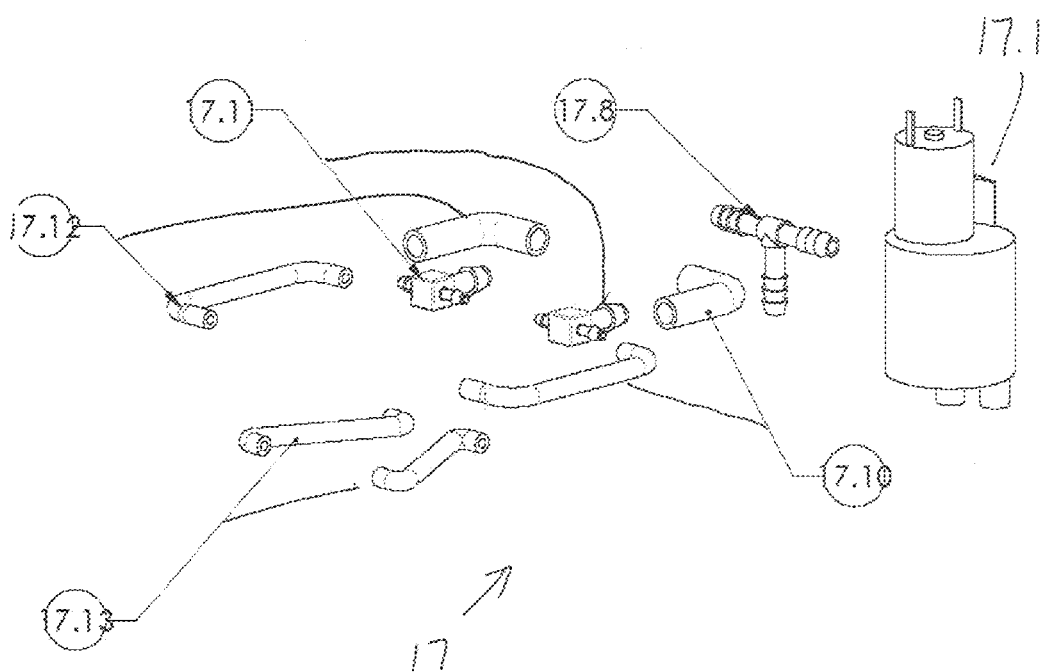
FIG. 18 depicts an exploded view of the pump and water tubing.

FIG. 18 depicts an exploded view of the water system 17 of the device. The water system 17 includes a pump 17.1 that is coupled to various tubing 17.12, 17.13, 17.20 and tees 17.11, 17.8. The pump 17.1 communicates water from the water source W to the water outlets 20 that are positioned at the base of the receptacles 12. The tubing 17.12, 17.13, and 17.20 seats under the funnel 18 and provides an entry point for the water on either side of each receptacle 12.

Figure 19:
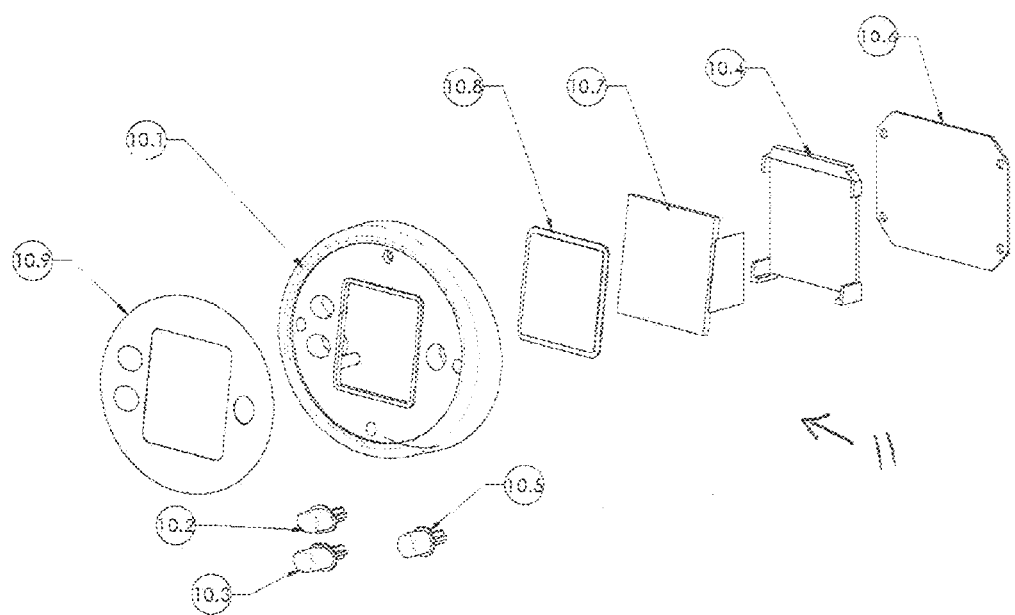
FIG. 19 depicts an exploded view of the display screen of the beverage dispenser.

FIG. 19 depicts an exploded view of the display unit 11 of the device. The display unit 11 is positioned on a front side of the device and faces the user. The display 11 may include the parts shown, or could have different parts. The display 11 has a front bezel 10.1 and a face plate 10.9. Three buttons are provided on the face place, including a clean button 10.3, a read button 10.2 and a mix button 10.5. A display lens 10.8 is positioned in the front bezel 10.2. An LCD 10.7 is positioned behind the display lens 10.8 and a display LCD 10.4 is positioned behind the LCD 10.4. A PC board 10.6 is coupled to the display LCD 10.4 and is positioned at the rear end of the display unit 11.

The containers 14 can be made of PET, Polypropylene, Polystyrene, PETG, Surlyn, and HDPE food-grade materials or other materials. The containers 14 may also include foil or other laminations, including any number of polymeric materials or combinations of materials in layers. The liner may comprise a combination of materials in layers, or could be a non-foil seal.

While not shown, four pouches 14 could be utilized instead of two, with two pouches being stacked on top of each other in each receptacle 12. In this case, the receptacles would need to be large enough to accommodate two pouches, or the pouches would need to be small enough to fit in a single receptacle 12. The cutting blade 40 would need to be long enough and sturdy enough to puncture all containers 14 in the receptacles.

The cutting blade 40 is a straight blade 40 that has a sharpened leading end 60. The leading end 60 of the blade 40 may be angled so that a tip of the blade 40 enters each container first, followed by the remainder of the blade 40. The blade 40 may be made of steel, another metal, or, in some cases, hard plastic.

The device 10 may be a counter-top machine that allows 2, 3, 4 or more containers 14 to be used at a single time. A water source W may be a water reservoir W that is refillable and part of the device 10. A tank of any size, such as 32 ounces, may be utilized as the water reservoir W. Alternatively, the device 10 could be connected to a water line so that the water reservoir W is not needed. As another option, the user could pour water into the machine when every drink is made, when a water reservoir W is not desired.

The container 14 sizes and shapes may vary from that shown here and relative to one another in use. One possible size for a large pouch is a capacity of 6-8 oz. Another pouch or container may have a size of 1-2 ounces. The pouches or containers 14 may hold concentrated ingredients. As such, the size of the pouches or containers 14 may be reduced. For example, a 2 ounce pouch of orange juice concentrate may make 8 ounces of juice when properly re-constituted. Examples of types of components that may be used in making a cocktail using the device 10 include the following, which represent different viscosities: Syrup, Alcohol, Juice/Juice Puree, Dairy, a combination thereof, or other components not mentioned.

The dispensing device 10 is compact and stylish. The dispensing device 10 is easily cleaned and maintained since the cutting assembly 9 can be physically removed from the housing 22. The divider plate 36 may also be removed. When both are removed, the funnel 18 is exposed. Thus, the entire area inside the housing 22 that is exposed to the contents of the containers 14 can be cleaned by a user.

Other features such as refrigeration, ice dispensation, and carbonation may be utilized with the device disclosed herein. For example, a separate container 14 may be added to the first and second containers 14 to provide a carbonating component. Alternatively, a separate carbonation system may be utilized along with flavoring and alcohol containers 14. A $CO_2$ container may be used for purposes of carbonation, if desired. Ice dispensing may be provided by an auxiliary device (not shown) that is either integral with or separate from the device 10. The device 10 may include a refrigeration component (not shown) in order to chill or cool the components rapidly during the dispensing process. The device 10 may include a sensory signal to indicate that the products are being mixed together during dispensation.

The dispenser 10 may be used to make any number of different types of cocktails. Examples of types of cocktails include those presented at http://www.drinksmixer.com/cat/1/ (12000+ cocktail recipes). As an example, one type of cocktail that may be made with the device 10 is "Sex on the Beach," a popular fruit mixed drink made of vodka, peach schnapps, creme de cassis, and orange and cranberry juices. An individual container 14 for "Sex on the Beach" may be input to the system as well as a "shot" container 14 that includes a combination of vodka, peach schnapps and crème de cassis. Alternatively, the "Sex on the Beach" container 14 may already include all the components with the exception of vodka, which may be input using a separate shot container 14. Alternatively, separate receptacles 12 for receiving multiple components may be used, or containers 14 may be sized to seat on top of or stacked against each other, with the cutting blade 40 slicing through all containers 14 in the receptacle 12 in order to permit the contents of the containers 14 to be evacuated. For example, a single receptacle 12 could house the "Sex on the Beach" non-alcoholic components while a second single receptacle 12 could house the alcohol components including a peach schnapps container 14, a crème de cassis container 14, and a vodka container 14. The alcohol components could be stacked on top of each other or otherwise arranged in the receptacle 12. The alcohol components could be the same size or different sizes, depending upon what is called for in the drink recipe.

The dispensing device 10 may alternatively be used to make health drinks, such as those that include nutritional supplements or other "health food" related components. One type of ingredient may be a mixture of vitamins in a concentrated liquid form, which are known to be more readily absorbed by the body. Alternatively, a powder-based mix may be used, with water from a water supply W being used to make the mixture flow through the system 10. Other types of health enhancing products may be used including vitamins, minerals, and other nutrients or products, as known by those of skill in the art. Pureed fruits and vegetables may be utilized to incorporate fruits and vegetables, if desired. For example, a kale-based container 14 could be used along with a mango-based container 14 along with a supplement container 14. Juices may be used. This permits the user to customize their "health" drink to find a drink mixture that they enjoy.

The device 10 may include other features that are now shown, such as a refrigeration component or chiller (not shown), an ice dispenser 10 (not shown), a carbonation unit, or other features as will be readily understood by those of skill in the art. The liquid mixture may also be dispensed into other types of receptacles, such as pitchers or mugs, for example (not shown). A chiller could be used to chill the water in the reservoir W or the ingredients in the containers 14.

The device 10 may include smart technology, such as an RFID chip reader and a processor and/or controller C for directing the operation of the device 10. The containers 14 may include a chip, such as an RFID chip that includes instructions for the device 10 to make the cocktail properly. For example, the chip may include instructions for how much water to add to the contents of the pouch, whether to use plain water or carbonated water, or a combination of both, how much pressure to apply to the contents of the container 14, or other instructions that aid in properly preparing a cocktail. A chip reader reads the instructions from the chip when the container 14 is placed into the receptacle 12. These instructions are then communicated to the processor, which then instructs the various parts of the device 10 to operate according to the instructions. The device 10 may include a processor and/or controller regardless of whether RFID technology is used in order to allow for proper operation of the device 10. Other ways, other than RFID technology, may be used in order to send instructions from the pouch to the processor, as known by those of skill in the art.

Alternatively, the system may include a bar code reader that reads a bar code that is positioned on one or both of the containers 14 in order to determine how much water to add to the contents of the containers 14. The "read" button 10.2 is used to read the bar code or the RFID chip, as discussed above. There may be instances when the read button 10.2 is not required, such as when all the containers 14 require the input of an equivalent amount of water, among other instances.

Various parts of the device 10 can be transparent, including the containers 14, if desired. Advertising material and instructions may be positioned on the containers 14 and on the devices 10.

An apparatus for making a beverage includes a housing, a first receptacle, a second receptacle, a cutting assembly, and a water source. The first receptacle is positioned in the housing for accepting a first beverage container containing a liquid. The second receptacle is positioned in the housing for accepting a second beverage container containing a liquid. The cutting assembly has a cutting blade 40 that is movable relative to the first and second receptacles for opening the first and second containers substantially simultaneously so that liquid stored therein can be at least in part evacuated. The water source is coupled to the housing. In addition, at least one water outlet is associated with one or more of the first and second receptacles for adding water to the liquid from the first and second beverage containers from the water source.

The apparatus may also include a funnel positioned below the first and second receptacles for receiving the liquid from the first and second beverage containers after the cutting blade has cut the first and second beverage containers. The cutting assembly may be removable from the housing for cleaning purposes. The apparatus may also include a divider plate positioned between the first and second receptacles, with the divider plate being removable from the housing for cleaning purposes. The apparatus may also include a pump and tubing coupled between the water source and the funnel, a control system and a display. The display may have at least at least a first button and a second button. The buttons may be coupled to the control system, with the first button providing a "mix" function when pressed that communicates a signal to the pump in order to pump water from the reservoir into the funnel.

The cutting assembly may include a cover, a cutter arm, and the cutting blade. The cover may be coupled to the cutter arm and the cutter arm may be coupled to the cutting blade. The cutting blade may be operatively associated with the cover. The cutting blade may move forward when the cover is closed in order to cut through both the first and the second containers.

The at least one first and second receptacles may have a resting surface that is angled at an angle relative to vertical such that any containers positioned in at least one of the first and second receptacles will rest at an angle when inserted into the respective receptacle. The angle may range from about 10 degrees to about 50 degrees. One angle is around 10 degrees, 20 degrees, 30 degrees, 40 degrees, or 50 degrees. The first and second receptacles may lean forward such that an upper end of the receptacle is positioned in front of a lower end of the receptacle.

The cutting assembly provides a mechanical advantage to the cutting blade.

The divider plate may have a slot for receiving the cutting blade therethrough. The cutting blade may move substantially horizontally during cutting. The cutting blade may move from back to front during cutting.

In another embodiment, an apparatus for making a beverage includes a housing, a cutting assembly, and a water source. The housing has a longitudinal axis associated with the height of the housing. The housing has at least a first receptacle and a second receptacle. The cutting assembly interacts with the first and second receptacles. The water source is coupled to the housing. The receptacles are angled such that any containers received in the receptacles are angled at an angle of about 10 degrees to about 50 degrees relative to the longitudinal axis of the housing.

The housing may include a forward-facing surface, and the receptacles may be angled towards the forward-facing surface such that a bottom end of each receptacle is positioned further away from the forward-facing surface than a top end of each receptacle. The apparatus may include a funnel positioned below the first and second receptacles. At least one water outlet may be associated with one or more of the first and second receptacles and the funnel for adding water thereto. The first and second receptacles are in direct communication with the funnel.

The cutting assembly may be removable from the housing. The cutting assembly may include a cover, a post and a receiver coupled to the cover, a cutter arm coupled to the post, and a cutting blade coupled to the cutter arm. Movement of the cover from an open to a closed position forces the post and receiver downwardly, thereby causing the cutting blade to rotate forward.

In another embodiment, a method for making a mixed drink includes depositing a first container having a liquid into a receptacle in a housing, depositing a second container having a liquid into a receptacle in the housing, opening the first and second containers in order to permit the contents to at least in part exit the containers by slicing the first and second containers with a cutting blade such that the liquid from the first and second containers enters a funnel positioned below the receptacles, pumping water from a water reservoir to mingle with the contents of the first and second containers in the funnel, and allowing the mingled contents of the first and second containers and the water to exit the housing through an opening in the funnel by gravity.

The containers may be opened substantially simultaneously.

The term "substantially," if used herein, is a term of estimation.

While various features of the claimed invention are presented above, it should be understood that the features may be used singly or in any combination thereof. Therefore, the claimed invention is not to be limited to only the specific embodiments depicted herein.

Further, it should be understood that variations and modifications may occur to those skilled in the art to which the claimed invention pertains. The embodiments described herein are exemplary of the claimed invention. The disclosure may enable those skilled in the art to make and use embodiments having alternative elements that likewise correspond to the elements of the invention recited in the claims. The intended scope of the invention may thus include other embodiments that do not differ or that insubstantially differ from the literal language of the claims. The scope of the present invention is accordingly defined as set forth in the appended claims.

What is claimed is:

1. An apparatus for making a beverage comprising:
    a housing;
    a first receptacle positioned in the housing for accepting a first beverage container containing a liquid;
    a second receptacle positioned in the housing for accepting a second beverage container containing a liquid;
    a cutting assembly having a cutting blade that is movable relative to the first and second receptacles for opening the first and second containers substantially simultaneously so that liquid stored therein can be at least in part evacuated; and at least one water outlet associated with one or more of the first and second receptacles for adding water to the liquid from the first and second beverage containers from a water source.

2. The apparatus of claim 1, further comprising a funnel positioned below the first and second receptacles for receiving the liquid from the first and second beverage containers after the cutting blade has cut the first and second beverage containers.

3. The apparatus of claim 2, further comprising:
a pump and tubing coupled between a water source and the funnel;
a control system;
a display having at least at least a first button and a second button, said buttons being coupled to the control system, with the first button providing a "mix" function when pressed that communicates a signal to the pump in order to pump water from a water source into the funnel.

4. The apparatus of claim 1, wherein the cutting assembly is removable from the housing for cleaning purposes.

5. The apparatus of claim 1, further comprising a divider plate positioned between the first and second receptacles, with the divider plate being removable from the housing for cleaning purposes.

6. The apparatus of claim 5, wherein the divider plate has a slot for receiving the cutting blade therethrough.

7. The apparatus of claim 1, wherein the cutting assembly includes a cover, a cutter arm, and the cutting blade, with the cover coupled to the cutter arm and the cutter arm coupled to the cutting blade, said cutting blade being operatively associated with the cover.

8. The apparatus of claim 7, wherein the cutting blade moves forward when the cover is closed in order to cut through both the first and the second containers.

9. The apparatus of claim 1, wherein at least one of the first and second receptacles has a resting surface that is angled at an angle relative to vertical such that any containers positioned in at least one of the first and second receptacles will rest at an angle when inserted into the respective receptacle.

10. The apparatus of claim 9, wherein the angle ranges from about 10 degrees to about 50 degrees.

11. The apparatus of claim 9, wherein the first and second receptacles lean forward such that an upper end of the receptacle is positioned in front of a lower end of the receptacle.

12. The apparatus of claim 1, wherein the cutting assembly provides a mechanical advantage to the cutting blade.

13. The apparatus of claim 1, wherein the cutting blade moves substantially horizontally during cutting; or
the cutting blade moves from back to front during cutting.

14. A method for making a mixed drink using the apparatus of claim 1, comprising:
depositing the first beverage container into the first receptacle;
depositing the second beverage container into the second receptacle;
opening the first and second beverage containers to permit the contents to at least in part exit the first and second beverage containers by slicing the first and second beverage containers with the cutting assembly;
pumping water from the water source to the at least one water outlet to mingle with the contents of the first and second beverage containers; and
allowing the mingled contents of the first and second containers and the water to exit the housing through an opening by gravity.

15. The method of claim 14, wherein the housing includes a funnel positioned below the first and second receptacles for accepting the liquid from the first and second beverage containers, with the funnel having the opening at a bottom end thereof to permit the exit of the liquids and water from the housing.

16. The apparatus of claim 14, wherein the first and second beverage containers are opened substantially simultaneously.

* * * * *